US010185821B2

(12) United States Patent
Iyer et al.

(10) Patent No.: US 10,185,821 B2
(45) Date of Patent: *Jan. 22, 2019

(54) USER ACTIVITY MONITORING BY USE OF RULE-BASED SEARCH QUERIES

(71) Applicant: Splunk Inc., San Francisco, CA (US)

(72) Inventors: Ravi Iyer, Mountain View, CA (US); Devendra Badhani, Santa Clara, CA (US); Vijay Chauhan, Burlingame, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,975

(22) Filed: Oct. 31, 2017

(65) Prior Publication Data
US 2018/0052994 A1    Feb. 22, 2018

Related U.S. Application Data

(63) Continuation of application No. 14/691,535, filed on Apr. 20, 2015, now Pat. No. 9,836,598.

(51) Int. Cl.
G06F 17/30 (2006.01)
G06F 21/55 (2013.01)
G06Q 10/00 (2012.01)
G06F 21/56 (2013.01)

(52) U.S. Cl.
CPC ........... G06F 21/552 (2013.01); G06Q 10/00 (2013.01); *G06F 21/566* (2013.01)

(58) Field of Classification Search
None
See application file for complete search history.

(56) References Cited

U.S. PATENT DOCUMENTS

| 7,555,645 | B2 | 6/2009 | Vissapragada |
| 7,653,633 | B2 | 1/2010 | Villella et al. |
| 8,180,713 | B1 | 5/2012 | Rigby et al. |
| 8,181,253 | B1 | 5/2012 | Zaitsev et al. |

(Continued)

OTHER PUBLICATIONS

Advisory Action dated Apr. 22, 2016, for U.S. Appl. No. 14/691,535 of Iyer, R. et al. filed Apr. 20, 2015.

(Continued)

*Primary Examiner* — Tarek Chbouki
*Assistant Examiner* — Eddy Cheung
(74) *Attorney, Agent, or Firm* — Perkins Coie LLP

(57) ABSTRACT

Systems and methods are disclosed for associating an entity with a risk score that may indicate a security threat associated with the entity's activity. An exemplary method may involve monitoring the activity of a subset of the set of entities (e.g., entities included in a watch list) by executing a search query against events indicating the activity of the subset of entities. The events may be associated with timestamps and may include machine data. Executing the search query may produce search results that pertain to activity of a particular entity from the subset. The search results may be evaluated based on a triggering condition corresponding to the statistical baseline. When the triggering condition is met, a risk score for the particular entity may be updated. The updated risk score may be displayed to a user via a graphical user interface (GUI).

30 Claims, 23 Drawing Sheets

(56) References Cited

U.S. PATENT DOCUMENTS

| | | |
|---|---|---|
| 8,364,666 B1 | 1/2013 | Katzir |
| 8,402,012 B1 | 3/2013 | Herz et al. |
| 8,412,696 B2 | 4/2013 | Zhang et al. |
| 8,543,694 B2 | 9/2013 | Petersen et al. |
| 8,589,403 B2 | 11/2013 | Marquardt et al. |
| 8,682,925 B1 | 3/2014 | Marquardt et al. |
| 8,744,894 B2 | 6/2014 | Christiansen et al. |
| 9,251,221 B1 | 2/2016 | Murphey et al. |
| 9,369,431 B1 | 6/2016 | Kirby et al. |
| 2005/0188423 A1 | 8/2005 | Motsinger et al. |
| 2007/0143851 A1 | 6/2007 | Nicodemus et al. |
| 2007/0233836 A1 | 10/2007 | Biazetti et al. |
| 2008/0288330 A1 | 11/2008 | Hildebrand et al. |
| 2009/0018983 A1 | 1/2009 | El-Rafei et al. |
| 2009/0328222 A1 | 12/2009 | Helman et al. |
| 2010/0050264 A1 | 2/2010 | Aebig et al. |
| 2010/0125911 A1* | 5/2010 | Bhaskaran ............. G06Q 10/10 726/23 |
| 2010/0228792 A1 | 9/2010 | Gray |
| 2011/0265162 A1 | 10/2011 | Alavandar et al. |
| 2012/0066763 A1 | 3/2012 | McHugh et al. |
| 2012/0136921 A1* | 5/2012 | Samdadiya ......... G06F 11/3006 709/203 |
| 2012/0151272 A1 | 6/2012 | Behrendt et al. |
| 2012/0246303 A1 | 9/2012 | Petersen et al. |
| 2012/0284221 A1 | 11/2012 | Shelton et al. |
| 2013/0019309 A1 | 1/2013 | Strayer et al. |
| 2013/0097701 A1 | 4/2013 | Moyle et al. |
| 2013/0124229 A1 | 5/2013 | Cashman et al. |
| 2013/0312097 A1 | 11/2013 | Turnbull |
| 2013/0318236 A1 | 11/2013 | Coates et al. |
| 2013/0318603 A1 | 11/2013 | Merza |
| 2013/0326620 A1* | 12/2013 | Merza ................. H04L 63/1408 726/22 |
| 2014/0059641 A1 | 2/2014 | Chapman, II et al. |
| 2014/0122461 A1 | 5/2014 | Singla |
| 2014/0160238 A1 | 6/2014 | Yim et al. |
| 2014/0188548 A1* | 7/2014 | Long ....................... G06F 21/55 705/7.28 |
| 2014/0236889 A1 | 8/2014 | Vasan et al. |
| 2014/0236890 A1 | 8/2014 | Vasan et al. |
| 2014/0283059 A1 | 9/2014 | Sambamurthy et al. |
| 2014/0314215 A1 | 10/2014 | Duva et al. |
| 2014/0324862 A1 | 10/2014 | Bingham et al. |
| 2014/0358982 A1 | 12/2014 | Pareek et al. |
| 2015/0229664 A1 | 8/2015 | Hawthorn et al. |
| 2016/0019215 A1 | 1/2016 | Murphey et al. |
| 2016/0019388 A1 | 1/2016 | Singla et al. |
| 2016/0088020 A1 | 3/2016 | Chan et al. |
| 2016/0147769 A1 | 5/2016 | Murphey et al. |
| 2016/0306965 A1 | 10/2016 | Iyer et al. |

OTHER PUBLICATIONS

Advisory Action dated Dec. 2, 2016, for U.S. Appl. No. 14/977,432, filed Dec. 21, 2015.
Final Office Action dated Feb. 11, 2016, for U.S. Appl. No. 14/691,535 of Iyer, R. et al. filed Apr. 20, 2015.
Final Office Action dated Jan. 17, 2018, for U.S. Appl. No. 14/977,432 of Murphey, L et al. filed Dec. 21, 2015.
Final Office Action dated Mar. 7, 2017, for U.S. Appl. No. 14/691,535 of Iyer, R., et al. filed Apr. 20, 2015.
Final Office Action dated May 4, 2015, for U.S. Appl. No. 14/447,995 of Murphey, L et al. filed Jul. 31, 2014.
Final Office Action dated Sep. 14, 2016, for U.S. Appl. No. 14/977,432 of Murphey, L. et al. filed Dec. 21, 2015.
Non-Final Office Action dated Aug. 18, 2017, for U.S. Appl. No. 14/977,432 of Murphey et al. filed Dec. 21, 2015.
Non-Final Office Action dated Aug. 26, 2016, for U.S. Appl. No. 14/691,535 of Iyer, R. et al. filed Apr. 20, 2015.
Non-Final Office Action dated Jul. 20, 2015, for U.S. Appl. No. 14/691,535 of Iyer, R. et al. filed Apr. 20, 2015.
Non-Final Office Action dated Mar. 28, 2016, for U.S. Appl. No. 14/997,432 Murphey, L. et al. filed Dec. 21, 2015.
Non-Final Office Action dated Mar. 8, 2017, for U.S. Appl. No. 14/977,432 of Murphey, L. et al. filed Dec. 21, 2015.
Non-Final Office Action dated Sep. 25, 2014, for U.S. Appl. No. 14/447,995 of Murphey, L. et al. filed Jul. 31, 2014.
Notice of Allowance dated Aug. 14, 2017, for U.S. Appl. No. 14/691,535 of Iyer et al. filed Apr. 20, 2015.
Notice of Allowance dated May 17, 2017, for U.S. Appl. No. 14/691,535 of Iyer, R. et al. filed Apr. 20, 2015.
Notice of Allowance dated Sep. 29, 2015, for U.S. Appl. No. 14/447,995 of Murphey, L. et al. filed Jul. 31, 2014.
"VMware, Inc., vSphere Monitoring and Performance, Update 1, vSphere 5.5, EN-001357-02, pp. 174, 2014".
Bitincka, L. , et al., "Optimizing Data Analysis with a Semi-Structured Time Series Database", In SLAML, '10, Jul. 31, 2013, 9 Pages.
Carasso, David , "Exploring Splunk—Search Processing Lananguage (SPL) Primer and Cookbook", Apr. 2012, Apr. 2012, 156 Pages.
PCI Manual , "User Review dashboard", [online], http://docs.splunk.com/Documentation/PCI/2.1.1/ [000119] User/IncidentReviewdashboard, 2 Pages, (Accessed Aug. 5, 2014).
Advisory Action dated Mar. 30, 2018, for U.S. Appl. No. 14/977,432 of Murphey, L. et al. filed Dec. 21, 2015.
Non-Final Office Action dated May 9, 2018, for U.S. Appl. No. 14/977,432 of Murphey, L. et al. filed Dec. 21, 2015.

* cited by examiner

FIG. 1

Risk Scoring Rule (e.g., Correlation Search) — 601, 607

| Rule Name | Web Uploads to Non-Corporate Sites by Entities |
|---|---|
| Application Context | DA-ESS-IdentityManagement |
| Description | Alerts on high volume web uploads by a entity to no... |

| Search Processing Language | (search processing language code) | — 603 |
|---|---|---|

Time Range
- Start time: -60m
- End time: -5m
- Cron Schedule: 35 * * * *

Throttling
- Window duration: 86400
- Fields to group by: Entity

ACTIONS — 609

Notable Event
  Create notable event

Risk Modifier Action — 611
  Create risk modifier ☒

- 613A — Score: 1
  Indicates how much a risk score of an entity should be adjusted

- 613B — Risk object field: Entity
  Indicates what field in the search result indicates the entity associated with the risk score to be adjusted

- 613C — Risk object type: Entity
  Indicates the type of the object that is associated with the risk score to be adjusted Other Actions
- Include in RSS feed
- Send email
- Run a script
- Start Stream capture

FIG. 6A

Original Search: 501
search "error | stats count BY host

Sent to peers: 502
search "error | prestats count BY host (map)

Executed by search head: 503
Merge prestats results received from peers (reduce)

USER ACTIVITY MONITORING BY USE OF RULE-BASED SEARCH QUERIES

CROSS-REFERENCE TO RELATED APPLICATION

This application is a continuation of U.S. patent application Ser. No. 14/691,535, filed on Apr. 20, 2015. The above-listed application is incorporated by reference herein in its entirety.

TECHNICAL FIELD

The present disclosure is generally related to data aggregation and analysis systems, and is more specifically related to assigning risk scores to entities based on evaluating triggering conditions applied to search results.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 1 schematically illustrates an exemplary GUI for specifying security score modification rules, including search queries, triggering conditions, and other information to be utilized by the system for assigning and/or modifying security risk scores associated with various objects, in accordance with one or more aspects of the present disclosure;

FIG. 6A schematically illustrates an exemplary GUI for displaying and modifying a risk scoring rule, in accordance with one or more aspects of the present disclosure.

FIG. 13 illustrates an exemplary search query received from a client and executed by search peers in accordance with one or more aspects of the present disclosure;

FIG. 14B illustrates a data summary dialog that enables a user to select various data sources in accordance with one or more aspects of the present disclosure;

FIG. 15B illustrates an incident review dashboard in accordance with one or more aspects of the present disclosure;

DETAILED DESCRIPTION

Figure 2:
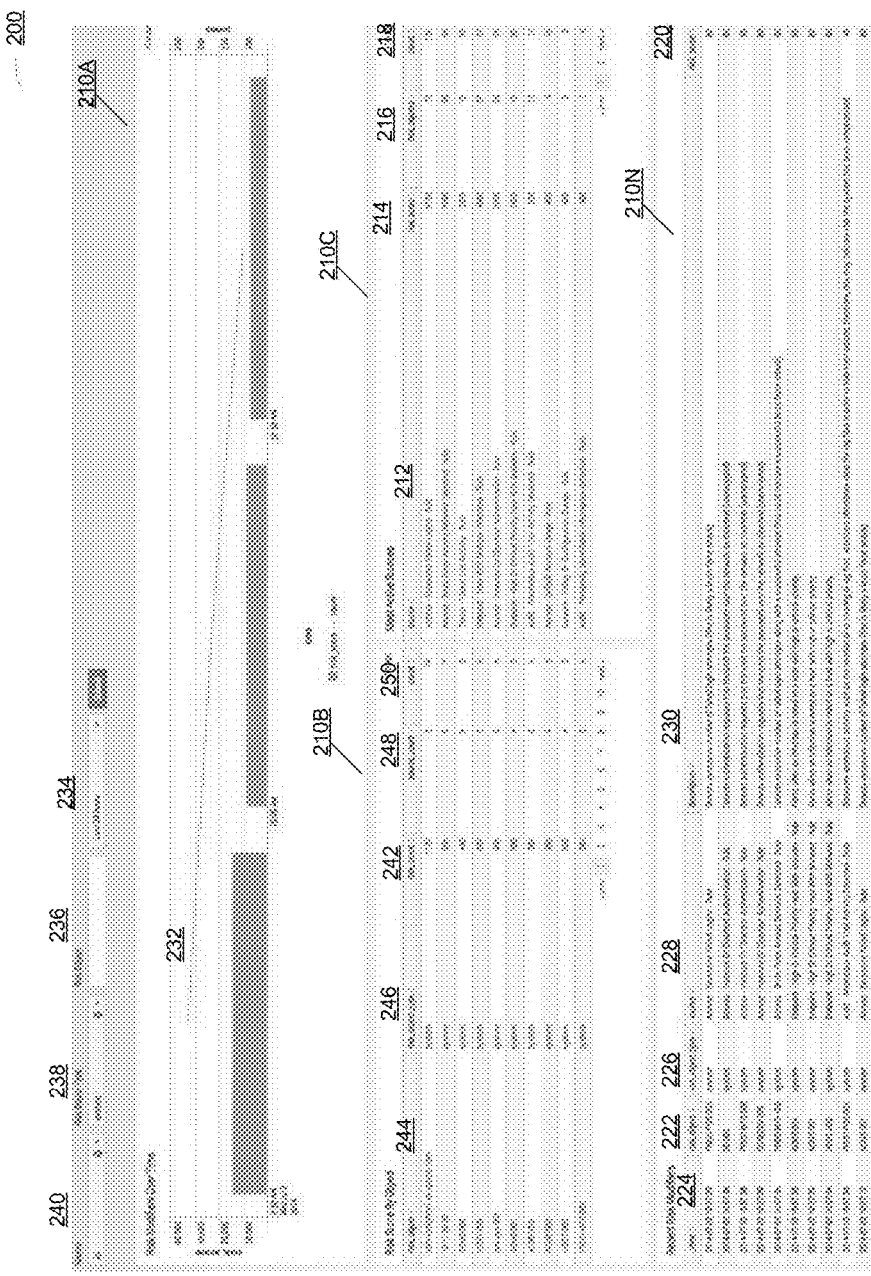
FIG. 2 schematically illustrates an exemplary GUI for visually presenting security risk scores assigned to a plurality of objects, in accordance with one or more aspects of the present disclosure.

Disclosed herein are systems and methods for assigning scores to objects based on evaluating triggering conditions applied to datasets produced by search queries.

An exemplary system is provided for creating and managing a watch list of entities (e.g., employees within an organization) that are being selected for monitoring from an insider threat perspective. The system is configured to monitor suspicious activity (e.g., failed authentications, sending large email attachments, concurrent accesses and so forth) and update risk scores in real time. Risk scores may indicate how suspicious an entity's activity is compared to activity of other entities. Monitoring every user in a large organization may be a huge computing task that is challenging to accomplish. By focusing on updating risk scores for a subset of all employees in an organization (e.g., only employees on a watch list) and by monitoring and scoring behaviors that are most likely to be associated with an insider threat, the amount of processing may be optimized. Alternatively, the system may create a baseline behavior for a peer group, such as an organizational unit (e.g., Human Resources, Finance, Marketing department, etc.) and monitor for suspicious activity of employees from the peer group to determine if activity of any the employees diverge from the baseline behavior of their peer group.

An exemplary data aggregation and analysis system may aggregate heterogeneous machine-generated data received from various sources, including servers, databases, applications, networks, etc. The aggregated source data may comprise a plurality of events. An event may be represented by a data structure that is associated with a certain point in time and comprises a portion of raw machine data (i.e., machine-generated data). The system may be configured to perform real-time indexing of the source data and to execute real-time, scheduled, or historic searches on the source data. A search query may comprise one or more search terms specifying the search criteria. Search terms may include keywords, phrases, Boolean expressions, regular expressions, field names, name-value pairs, etc. The search criteria may comprise a filter specifying relative or absolute time values, to limit the scope of the search by a specific time value or a specific time range.

The exemplary data aggregation and analysis system executing a search query may evaluate the data relative to the search criteria to produce a resulting dataset. The resulting dataset may comprise one or more data items representing one or more portions of the source data that satisfy the search criteria. Alternatively, the resulting dataset may just include an indication that the search criteria have been satisfied. Yet alternatively, the resulting dataset may include a number indicating how many times the search criteria have been satisfied.

The exemplary data aggregation and analysis system may be employed to assign scores to various objects associated with a distributed computer system (e.g., an enterprise system comprising a plurality of computer systems and peripheral devices interconnected by a plurality of networks). An object may represent such things as an entity (such as a particular user or a particular organization), or an asset (such as a particular computer system or a particular application). In various illustrative examples, the scores assigned by the data aggregation and analysis system may represent security risk scores, system performance scores (indicating the performance of components such as hosts, servers, routers, switches, attached storage, or virtual machines in an IT environment), or application performance scores. In certain implementations, the scores assigned by the data aggregation and analysis system may belong to a certain scale. Alternatively, the scores may be represented by values which do not belong to any scale. In certain implementations, the scores may be represented by dimensionless values.

In certain implementations, the data aggregation and analysis system may adjust, by a certain score modifier value, a risk score assigned to a certain object responsive to determining that at least a portion of a dataset produced by executing a search query satisfies a certain triggering condition. A triggering condition can be any condition that is intended to trigger a specific action. An exemplary triggering condition can trigger an action every time search criteria are satisfied (e.g., every time a specific user has a failed authentication attempt). Another example is a triggering condition that can trigger an action when a number specifying how many times search criteria have been satisfied exceeds a threshold (e.g., when the number of failed authentication logins of a specific user exceeds 5). Yet another example is a triggering condition that pertains to aggregating a dataset returned by the search query to form statistics pertaining to one or more attributes of the dataset that were used for aggregation, where the triggering condition can trigger an action when the aggregated statistics meet a criteria such as exceeding a threshold, being under a threshold, or falling within a specified range. For example, a dataset returned by the search query may include failed authentication attempts for logging into any application (e.g., email application, CRM application, HCM application, etc.) and initiated by numerous source IP (Internet Protocol) addresses; the dataset may be aggregated to produce counts of failed authentication attempts on a per application per source basis (i.e., first aggregated by application and then further aggregated by source); and the triggering condition may trigger an action when any of the counts exceeds a threshold. It should be noted that in some implementations, the evaluation of the aggregated statistics can be handled as part of the search query, and not as part of the triggering condition evaluation (where the triggering condition either triggers every time the search criteria are met or triggers when the search criteria are met at least a minimum number of times when the search is run).

A triggering condition may be applied to a dataset produced by a search query that is executed by the system either in real time or according to a certain schedule. Whenever at least a portion of the dataset returned by the search satisfies the triggering condition, a risk score associated with a certain object to which the portion of the dataset pertains (e.g., an object that is directly or indirectly referenced by the portion of the dataset) may be modified (increased or decreased) by a certain risk score modifier value.

In an illustrative example, the risk score associated with an object may be modified every time the dataset returned by the search query includes an indicator that the search criteria of the search query are satisfied. Alternatively, the risk score associated with an object may be modified when the number of times the search criteria are satisfied exceeds a threshold. Yet alternatively, the risk score associated with an object may be modified when the aggregated statistics pertaining to the dataset returned by the query meet specified criteria (such as exceeding a threshold, being under a threshold, or falling within a specified range).

The risk score modifier value may be determined based on values of one or more fields of the portion of the dataset that has triggered the risk score modification, as described in more detail below.

The data aggregation and analysis system may be further configured to present the assigned risk scores via a graphical user interface (GUI) of a client computing device (e.g., a desktop computing device or a mobile computing device), as described in more detail below.

Accordingly, implementations of the present disclosure provide an effective mechanism for managing IT security, IT operations, and other aspects of the functioning of distributed computer or information technology systems by adjusting scores (e.g., security risk scores or performance scores) of objects in response to detecting an occurrence of certain conditions as indicated by data (e.g., the machine derived) produced by the system. The adjusted scores of objects are then visually presented to a user such as a system administrator to allow the user to quickly identify objects with respect to which certain remedial actions should be taken.

Various aspects of the methods and systems are described herein by way of example, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
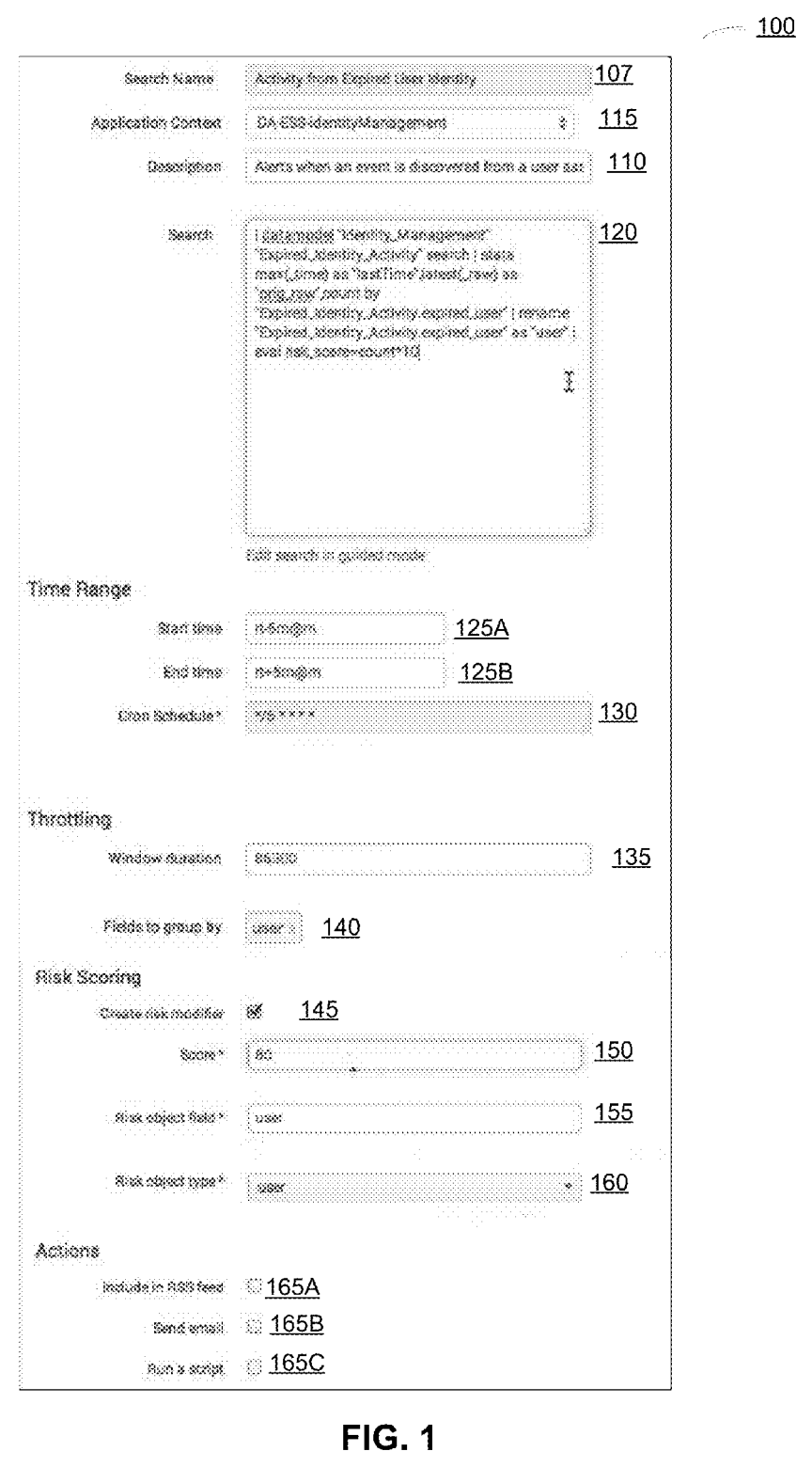

FIG. 1 schematically illustrates an exemplary GUI for specifying security score modification rules, including search queries, triggering conditions, and other information to be utilized by the system for assigning and/or modifying security risk scores associated with various objects, in accordance with one or more aspects of the present disclosure. While FIG. 1 and the corresponding description illustrate and refer to security risk scores, same and/or similar GUI elements, systems and methods may be utilized by the exemplary data aggregation and analysis system for specifying data searches, triggering conditions, and other information to be utilized by the system for assigning other types of scores, such as system performance scores or application performance scores. System or application performance scores may be utilized for quantifying various aspects of system or application performance, e.g., in situations when no single objectively measurable attribute or characteristic may reasonably be employed for the stated purpose.

As schematically illustrated by FIG. 1, exemplary GUI 100 may comprise one or more input fields for specifying search identifiers such as an alphanumeric name 107 and an alphanumeric description 110 of the security score modification rule defined by the search. Exemplary GUI 100 may further comprise a drop-down list for selecting the application context 115 associated with the search. In an illustrative example, the application context may identify an application of a certain platform, such as the SPLUNK® ENTERPRISE system produced by Splunk Inc. of San Francisco, Calif., which is described in more details herein below).

In certain implementations, exemplary GUI 100 may further comprise a text box 120 for specifying a search query string comprising one or more search terms specifying the search criteria. The search query string may comply with the syntax of a certain query language supported by the data aggregation and retrieval system, such as Splunk Search Processing Language (SPL) which is further described herein below. Alternatively, the search query may be specified using other input mechanisms, such as selecting the search query from a list of pre-defined search queries, or building the search query using a wizard comprising a plurality of pre-defined input fields.

Exemplary GUI 100 may further comprise a start time and end time input field's 125A-125B. In an illustrative example, the start time and end time may define a time window specified relative to the current time (e.g., from 5 minutes before the current time to the current time). The start time and end time input fields specify the time range limiting the scope of the search, i.e., instructing the exemplary data aggregation and analysis system to perform the search query on the source data items (e.g., events) that have timestamps falling within the specified time range.

Exemplary GUI 100 may further comprise a schedule input field 130 to define the schedule according to which the search query should be executed by the exemplary data aggregation and analysis system. The schedule may be represented by a data structure comprising values of one or more scheduling parameters (e.g., minute, hour, day, month, and/or day-of-week). Executing search query according to a certain schedule may be useful, e.g., for a search query that has its scope limited by a time window specified relative to the time the query is run (e.g., from 5 minutes before the time of beginning execution of the query to the time of beginning execution of the query).

Exemplary GUI 100 may further comprise a throttling window input field 135 and a grouping field selection field 140 to define a throttling condition. The throttling condition may be utilized to suppress, for a certain period of time (e.g., for a number of seconds specified by field 135), triggering the score modification and/or other actions associated with the search query. Grouping field 140 may be utilized to select a field by the value of which the search results should be grouped for evaluating the throttling condition. In other words, the exemplary data aggregation and analysis system may suppress the actions associated with the search query for a specified number of seconds for the search results that include the same value in the specified field (e.g., the same user identifier in the "user" field shown in the grouping field 140 in the illustrative example of FIG. 1).

Exemplary GUI 100 may further comprise a "Create risk score modifier" checkbox 145 specifying that the specified risk score modification actions should be performed based on a trigger condition resulting from execution of the search query.

As noted herein above, the data aggregation and analysis system may be configured to adjust, by a certain risk score modifier value, the risk score assigned to one or more objects responsive to determining that at least a portion of a dataset produced by the search satisfies a particular triggering condition. In an illustrative example, the risk score associated with an object may be modified every time the search query returns an indicator that the search criteria are satisfied. Alternatively, the risk score associated with an object may be modified when the number of times the search criteria were satisfied exceeds a threshold. In yet another example, the risk score associated with an object may be modified when the aggregated statistics pertaining to the dataset returned by the search query meets certain criteria (e.g., exceeding a threshold, being under a threshold, or falling within a certain range).

In the illustrative example of FIG. 1, the risk score modifier value is specified by input field 150 as a constant integer value. Alternatively, the risk score modifier value may be determined by performing certain calculations on one or more data items (referenced by the corresponding field names) that are identified by the search query as meeting the criteria of the query. Risk score modifiers may be provided by positive or negative values. A positive risk score modifier value may indicate that the total risk score associated with an object should be increased (e.g., if the object represents a user who has been engaged in an activity associated with an elevated risk score value). A negative risk score modifier value may indicate that the total risk score associated with an object should be decreased (e.g., if the object represents a system administrator who has been engaged in an activity that, if performed by a non-privileged user, would appear as associated with an elevated risk score value). The object whose score should be modified may be identified by a field in the data meeting the search criteria and/or triggering condition.

In an illustrative example, each occurrence of a certain pre-defined state or situation defined by the search criteria may necessitate modifying a risk score assigned to an object by a certain integer value. The arithmetic expression defining the risk score modifier may specify that the integer value should be multiplied by the number of occurrences of the state or situation returned by the search query (e.g., if a failed login attempt increases a user's risk score by 10, the arithmetic expression defining the risk score modifier may specify the value being equal to 10*N, wherein N is the number of failed login attempts). In another illustrative example, the risk score modifier may be proportional to a metric associated with a certain activity (e.g., if each kilobyte of VPN traffic increases the user's risk score by 12, the arithmetic expression defining the risk score modifier may specify the value being equal to 12*T/1024, wherein T is the amount of VPN traffic, in bytes, associated with the user, and 1024 is the number of bytes in a kilobyte; in this case, the number of kilobytes of VPN traffic may be extracted from a field in the data that met the search criteria and resulted in the triggering condition). Likewise, the object whose score should be modified may be identified from a field in the data that met the search criteria and resulted in the triggering condition.

Exemplary GUI 100 may further comprise a risk object field 155 to identify the object whose risk score should be modified by the exemplary data aggregation and analysis system. The risk object may be identified by a data item (such as by a field in the data item that is referenced by the field name 155) included in a dataset produced by the search query. Exemplary objects may include a user, a computer system, a network, an application, etc.

In certain implementations, should the identified field name contain an empty value, the exemplary data aggregation and analysis system may apply the risk score modifier to the risk score associated with a placeholder (or fictitious) object used for accumulating risk score modifiers that cannot be traced to a particular known object. In an illustrative example, the fictitious object to which risk score modifiers associated with unidentified objects are applied may be referenced by a symbolic name (e.g., UNKNOWN object). Applying risk score modifiers associated with unidentified objects to a fictitious object may be utilized to attract a user's attention to the fact that certain objects associated with non-zero (or even significant) risk scores could not be identified by the system.

Exemplary GUI 100 may further comprise a risk object type field 160 to identify the type of risk object 155. In various illustrative examples, the risk object type may be represented by one of the following types: an entity (such as a user or an organization), an asset (such as a computer system or an application), or a user-defined type (e.g., a building).

Exemplary GUI 100 may further comprise one or more action check-boxes 165A-165C to specify one or more actions to be performed by the system responsive to determining that at least a portion of the dataset produced by executing the specified search query satisfies the specified triggering condition. The actions may include, for example, sending an e-mail message comprising the risk score modifier value and/or at least part of the dataset that has triggered the risk score modification, creating an RSS feed comprising the risk score modifier value and/or at least part of the dataset that has triggered the risk score modification, and/or executing a shell script having at least one parameter defined based on the score.

In certain implementations, the specified actions may be performed with respect to each result produced by the search query defined by query input field 110 (in other words, the simplest triggering condition is applied to the resulting dataset requiring that the resulting dataset comprise a non-zero number of results). Alternatively, an additional triggering condition may be applied to the resulting dataset produced by the search query (e.g., comparing the number of data items in the resulting dataset produced to a certain configurable integer value or performing a secondary search on the dataset produced by executing the search query).

In certain implementations, responsive to modifying a score assigned to the primary object, the exemplary data aggregation and analysis system may also modify scores assigned to one or more additional objects that are associated with the primary object. For example, if a security risk score assigned to an object representing a user's laptop is modified responsive to a certain triggering condition, the system may further modify the security risk score assigned to the object representing the user himself. In an illustrative example, the exemplary data aggregation and analysis system may identify one or more additional objects associated with the primary objects based on one or more object association rules. In another illustrative example, the exemplary data aggregation and analysis system may identify one or more additional objects associated with the primary objects based on performing a secondary search using a pre-defined or dynamically constructed search query. The risk score modifier value to be applied to the associated additional object may be determined based on the risk score modifier value of the primary object and/or one or more object association rules. In an illustrative example, an object association rule may specify that the risk score modifier value of an additional object (e.g., a user) associated with a primary object (e.g., the user's laptop) may be determined as a certain fraction of the risk score modifier value of the primary object.

As noted herein above, the exemplary data aggregation and analysis system may be further configured to present the assigned security risk scores via a graphical user interface (GUI) of a client computing device (e.g., a desktop computing device or a mobile computing device). FIG. 2 schematically illustrates an exemplary GUI for visually presenting security risk scores assigned to a plurality of objects, in accordance with one or more aspects of the present disclosure. While FIG. 2 and the corresponding description illustrate and refer to security risk scores, the same and/or similar GUI elements, systems, and methods may be utilized by the exemplary data aggregation and analysis system for visually presenting other types of scores, such as system performance scores or application performance scores.

As schematically illustrated by FIG. 2, exemplary GUI 200 may comprise several panels 210A-210N to dynamically present graphical and/or textual information associated with security risk scores. In the illustrative example of FIG. 2, exemplary GUI 200 may further comprise a panel 210A showing a graph 232 representing the total risk score value assigned to a selected set of objects within the time period identified by time period selection dropdown control 234. The set of objects for displaying the risk score values may be specified by the risk object identifier (input field 236), and/or risk object type (input field 238). The risk score values may be further filtered by specifying the risk object sources (e.g., risk score modification rules) via input field 240.

Exemplary GUI 200 may further comprise panel 210B representing, in a rectangular table, risk scores (column 242) assigned to a plurality of objects identified by symbolic names (column 244). The set of objects for which the scores are displayed and/or the risk scores to be displayed may be limited by one or more parameters specified by one or more fields of the input panel 210A, such as only displaying risk modifiers resulting from selected search/trigger combinations (source pull down menu 240), only displaying objects of a given object type (pull down menu 238), only displaying particular objects entered in the box 236, or calculating the scores for displayed objects by aggregating only those risk score modifiers for each displayed object that occur with a time range specified in time-range pulldown menu 234.

The table entries displayed within display panel 210B may be sorted, e.g., in a descending order of total risk score associated with the corresponding object, thus allowing the user to focus on the objects associated with the largest values of risk security scores. Panel 210B may further comprise column 246 showing the object type (e.g., a user type, a system type, or a user-defined type). In the illustrative example of FIG. 2, the object types shown in column 246 may match the object type specified by pull-down menu 238. Panel 210B may further comprise column 248 showing the number of search/trigger/score rules (each of which is referred to as a "source") contributing to the total risk score associated with the object identified by column 244 (or, in other words, the number of rules for which the object has satisfied the triggering condition). Panel 210B may further comprise column 250 showing the number of individual risk score modifiers reflected by the total risk score associated with the object identified by column 242 (or, in other words, the number of times when a triggering condition was met by the object).

Exemplary GUI 200 may further comprise panel 210C representing, in a rectangular table, aggregate risk score values of the various risk modifiers grouped by the sources (e.g., risk score modification rules identified by symbolic names in column 212) that generated the risk modifiers and ordered in the descending order of the risk score value (column 214). Panel 210C may further comprise column 216 showing the number of objects having their risk score values modified by the corresponding source, and column 218 showing the number of individual risk score modifiers reflected by the total risk score value identified by column 214.

Exemplary GUI 200 may further comprise a panel 210N representing, in a rectangular table, the most recently created risk modifiers (the score for which is provided in column 220, and a description of the risk score rule that generated the risk modifier is provided in column 230). Each row may display the object whose score is affected by the risk modifier represented by that row (column 222). The table entries may be ordered in the reverse time order (most recent entries first) based on the risk modifier creation time (column 224). Panel 210N may further comprise column 226 showing the object type for the object in column 222, column 228 showing the risk modifier source (e.g., a symbolic name referencing the risk score modification rule that generated the risk modifier represented in a given row).

In certain implementations, the exemplary data aggregation and analysis system may allow a user to "drill down" to the underlying data that has triggered a particular risk score modifier. For example, responsive to receiving the user's selection of a particular risk score modifier, the system may display further information pertaining to the selected modifier, such as the underlying portion of the data that has triggered the risk score modifier.

In certain implementations, the exemplary data aggregation and analysis system may provide an "ad hoc" score modification interface to allow a user to adjust risk score modifiers assigned to certain objects. In an illustrative example, a user may increase or decrease a risk score value assigned to a certain object or a group of objects.

Figure 3A:
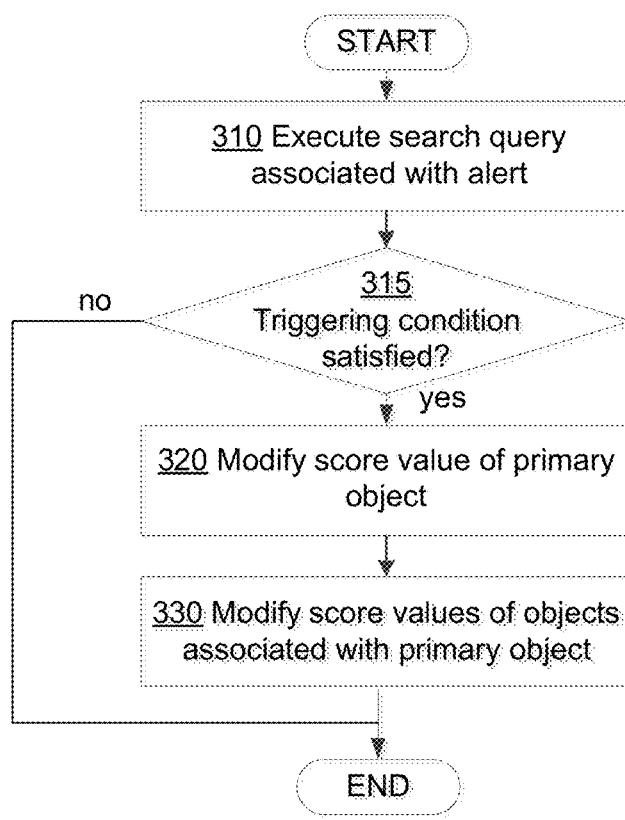
FIGS. 3A-3B depict flow diagrams of exemplary methods for assigning scores to objects based on evaluating triggering conditions applied to datasets produced by search queries, in accordance with one or more aspects of the present disclosure.
Figure 3B:
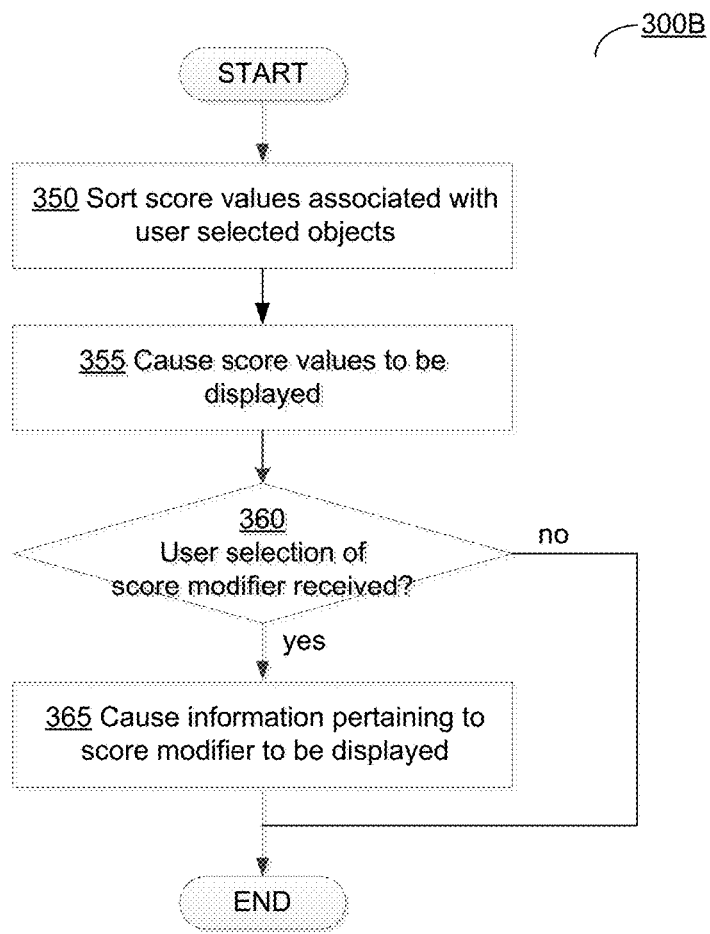

FIGS. 3A-3C depict flow diagrams of exemplary methods 300A-300B for assigning scores to objects based on evaluating triggering conditions applied to datasets produced by search queries. Methods 300A-300B and/or each of their respective individual functions, routines, subroutines, or operations may be performed by one or more general purpose and/or specialized processing devices. Two or more functions, routines, subroutines, or operations of methods 300A-300B may be performed in parallel or in an order that may differ from the order described above. In certain implementations, one or more of methods 300A-300B may be performed by a single processing thread. Alternatively, methods 300A-300B may be performed by two or more processing threads, each thread executing one or more individual functions, routines, subroutines, or operations of the respective method. In an illustrative example, the processing threads implementing methods 300A-300B may be synchronized (e.g., using semaphores, critical sections, and/or other thread synchronization mechanisms). Alternatively, the processing threads implementing methods 300A-300B may be executed asynchronously with respect to each other. In an illustrative example, methods 300A-300B may be performed by an exemplary computing device 1000 described herein below with references to FIG. 16. In another illustrative example, methods 300A-300B may be performed by a distributed computer system comprising two or more exemplary computing devices 1000.

FIG. 3A depict a flow diagram of an exemplary method 300A for modifying score values assigned to certain objects based on search query results, in accordance with one or more aspects of the present disclosure.

Referring to FIG. 3A, at block 310, the computer system implementing the method may execute a search query. In an illustrative example, the search query may represent a real-time search (e.g., may repeatedly be executed by a certain process or thread in an indefinite loop which may be interrupted by occurrences of certain terminating conditions). In another illustrative example, the search query may represent a scheduled search (e.g., may be executed according to a certain schedule), as described in more details herein above.

Responsive to determining, at block 315, that a portion of the dataset produced by the search query satisfies a triggering condition defined by a risk score modification rule associated with the search query, the processing may continue at block 320; otherwise, the processing associated with the current search query instance may terminate.

At block 320, the computer system may modify a risk score value of a certain primary object by a risk score modifier value. The primary object may be identified based on values of one or more fields of the portion of the dataset returned by the search query, in accordance with the risk score modification rule associated with the search query, as described in more details herein above. The risk score modifier values may be determined in accordance with the risk score modification rule associated with the search query. In an illustrative example, the risk score modifier value applicable to a certain object may be defined as a constant integer value. Alternatively, the risk score modifier value may be determined by performing certain calculations on one or more data items (e.g., by extracting values for fields in the data items that are used in the calculation) included in the resulting dataset produced by the search query. In an illustrative example, the risk score modifier value may be specified by a certain arithmetic expression. The arithmetic expression may comprise one or more arithmetic operations to be performed on two or more operands. Each of the operands may be represented by a value of a data item (referenced by the corresponding field name) included in the resulting dataset produced by the search query or by a certain constant value.

At block 330, the computer system may modify risk score values of certain objects associated with the primary object. The exemplary data aggregation and analysis system may identify one or more objects associated with the primary object based on one or more object association rules. The risk score modifier value to be applied to the associated additional object may be determined based on the risk score modifier value of the primary object and/or one or more object association rules, as described in more details herein above with references to FIG. 1.

FIG. 3B depicts a flow diagram of an exemplary method 300B for presenting score modifier information, in accordance with one or more aspects of the present disclosure. As noted herein above, method 300B may be implemented by a server (e.g., a presentation server) and/or by one or more clients of the distributed computer system operating in accordance with one or more aspects of the present disclosure.

Referring to FIG. 3B, at block 350, the computer system implementing the method may sort the score modifier information associated with certain objects in an order reflecting the corresponding score modifier values (e.g., in the descending order of the score modifier values). The objects for displaying the associated score modifier information may be selected by a user via a GUI, as described in more details herein above with reference to FIG. 2.

At block 355, the computer system may cause the score modifier information to be displayed by a client computing device, as described in more details herein above with reference to FIG. 2.

Responsive to receiving, at block 360, a user's selection of a particular score modifier of the displayed score modifiers, the computer system may, at block 365, cause further information pertaining to the selected modifier to be displayed, including the underlying portion of the dataset that has triggered the risk score modifier.

The systems and methods described herein above may be employed by various data processing systems, e.g., data aggregation and analysis systems. In certain implementations, the exemplary data aggregation and analysis system may perform search queries on data (e.g., relating to the security of an IT environment or related to the performance of components in that IT environment) that is stored as "events," wherein each event comprises a portion of machine data generated by the computer or IT environment and that is correlated with a specific point in time. In various illustrative examples, the data processing system may be represented by the SPLUNK® ENTERPRISE system produced by Splunk Inc. of San Francisco, Calif., to store and process performance data. The data processing system may be configured to execute search queries as correlational searches, as described in more details herein below. In certain implementations, the risk scoring framework may be included in an application like the SPLUNK® APP FOR ENTERPRISE SECURITY.

Figure 4:
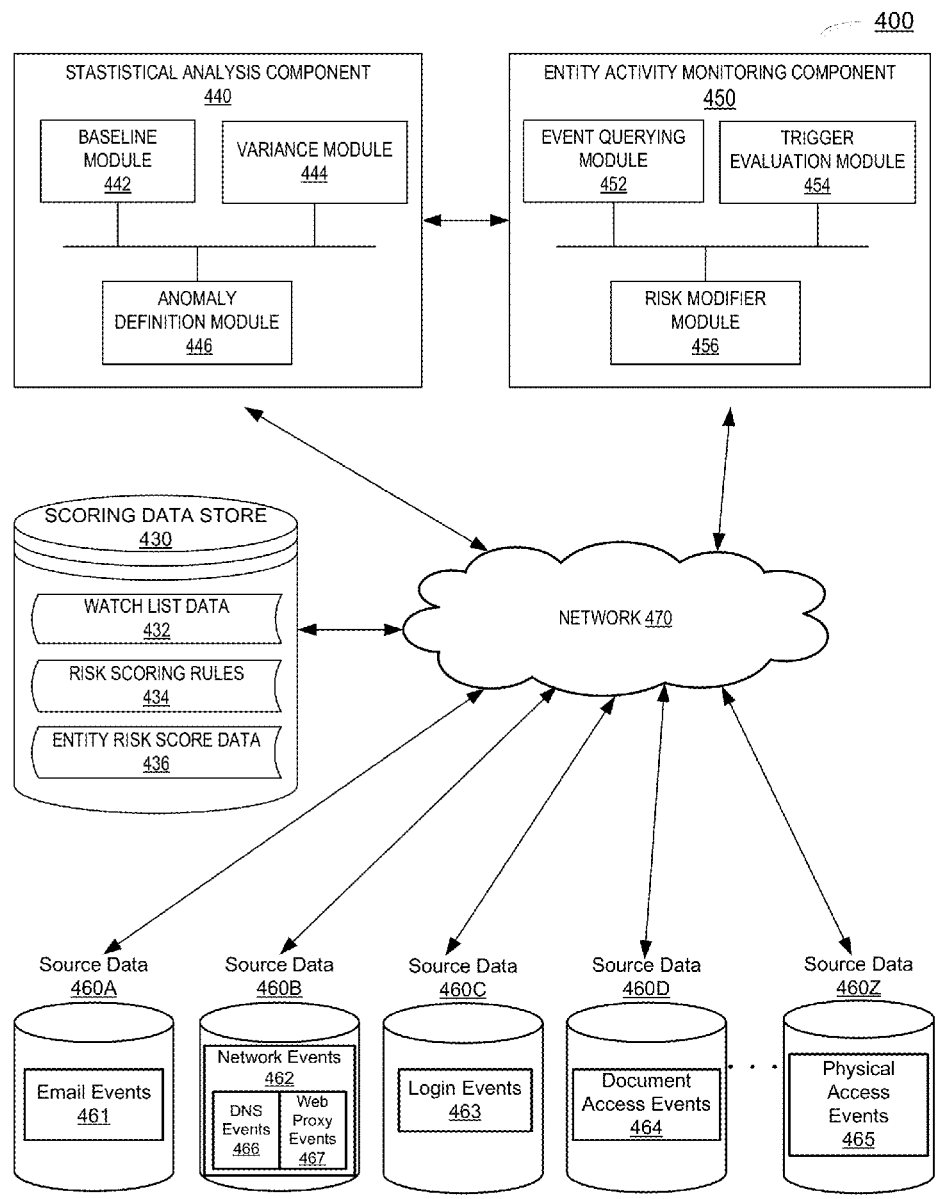
FIG. 4 presents a block diagram of an event-processing system that assigns risk scores to entities based on evaluating triggering conditions, in accordance with one or more aspects of the present disclosure.

FIG. 4 is an example of an aggregation and analysis system 400 that monitors activity of one or more entities (e.g., one or more employees, consultants, business partners, etc.) and associates the entities with risk scores that represent a security threat imposed by an entity to e.g., an organization. In one example, system 400 may be configured to detect internal threats by employees, consultants and business partners and may trigger alerts that can be viewed by security personnel of an organization. Aggregation and analysis system 400 may include a scoring data store 430, a statistical analysis component 440, an entity activity monitoring component 450, and a plurality of source data 460A-Z stored in one or more data stores, which may all be interconnected via network 470. Source data 460A-Z may represent multiple different types of events that include raw machine data generated by various sources, including servers, databases, applications, networks, etc. Source data stores 460A-Z may include, for example, email events 461, network access events 462, login events 463, document access events 464 and physical access events 465. Alternatively, source data 460A-Z may be combined into aggregated source data including events of different types.

Scoring data store 430 may include watch list data 432, risk scoring rules 434 and entity risk scoring data 436. Watch list data 432 may include a watch list specifying a subset of entities that have been identified for additional monitoring. When an entity is included within a watch list, the entity may be monitored more often or more thoroughly. Monitoring an entity more often may entail executing searches more often to assess the entity's activity. Monitoring an entity more thoroughly may involve searching additional data sources (e.g., types of activity) that may not be searched otherwise when an entity is not on the watch list. Risk scoring rules 434 may include one or more scoring rules and each scoring rule may include a search query, a triggering condition, and a risk scoring modifier. In one example, each scoring rule may be in the form of a correlation search, which is discussed in more detail below.

In one example, there may be a separate risk scoring rule for each of the following events, such as emailing, performing web uploads, accessing non-corporate web site, performing simultaneous logins and performing geographically distributed logins that are implausible ("impossible travel"). In another example, multiple risk scoring rules may be combined into a single risk scoring rule (e.g., an aggregate risk scoring rule). Risk scoring data 436 may include multiple risk scores for different entities. The risk scores may include aggregate risk scores that summarize risk scores for multiple entities across multiple specific risk scoring rules (e.g., email, web upload).

Statistical analysis component 440 may analyze the activity of multiple entities to identify a normal behavior for a set of entities. The set of entities may be associated with an organization (e.g., a corporation, government, firm) or with a unit of an organization (e.g., department, group). "Normal behavior" may refer to a behavior that is considered as not indicative of a security threat to an organization or an organization unit. In one example, the entities may be employees, contractors, consultants or other similar entities with access to information of an organization. An entity may be associated with one more entity accounts and one or more entity devices. Collectively, the entity accounts and entity devices may represent the entity. For example, the activity of an entity's accounts and devices may be associated with the entity for purposes of assessing a risk score of an entity. Statistical analysis component 440 may include a baseline module 442, a variance module 444 and anomaly definition module 446.

Baseline module 442 may execute a search query against some or all of the events 461 through 467 to determine a statistical baseline of entity activity. The statistical baseline may represent the typical or normal activity of an entity or a set of entities over a predetermined duration of time. In one example, entity activity may be compared to the statistical baseline to identify anomalous entity behavior. In another example, the baseline may be specific to an entity and may be used to identify a change in a specific entity's behavior.

The statistical baseline may include one or more metrics corresponding to entity activity and may include quantity (e.g., number of occurrences of an event), time of activity (e.g., beginning or end), duration (e.g., duration of activity or duration between activities), entity location or other activity-related data. The statistical baselines may be organized based on the source data, which include events of different types, such as email events 461, network access events 462, login events 463, document access events 464 and physical access events 465 from which the activity was derived. Alternatively, the statistical baselines may be cross-correlated into a baseline entity profile that spans one or more types of source data 460A-Z.

Baseline module 442 may utilize multiple different statistical operations to determine the statistical baseline. In one example, baseline module 442 may determine the statistical baseline by determining the median value of a specific activity across multiple entities. In other examples, the baseline module 442 may determine the statistic baseline by averaging the activity over the number of entities. In other examples, the statistical baseline may be determined using a variety of statistical operations or statistical modeling techniques.

The statistical baseline may be stored in scoring data store 430 and may be updated once new events are added. In one example, the statistical baseline may be periodically updated, for example, by repeatedly executing a re-occurring function (e.g., scheduled job) that analyzes new events. In another example, the statistical baseline may be continuously updated using a rolling window. New events are used to update the statistical baseline and events that fall outside of the rolling window are removed from the statistical baseline.

Variance module 444 may extend the baseline module and may determine the statistical variations between the activities of the entities. In one example, variance module 444 may determine the activity variance between an entity with the least amount of an activity and entity with the most amount of activity.

Anomaly definition module 446 may define one or more triggering conditions which when applied would determine anomalous activity. In some implementations, anomaly definition module 446 uses the statistical baseline for a triggering condition (e.g., any activity exceeding or not reaching the statistical baseline should be considered anomalous). In alternative implementations, anomaly definition module 446 utilizes data generated both by baseline module 442 and variance module 444 to identify one or more triggering conditions that identify activity that is anomalous. For example, anomaly definition module 446 may evaluate the statistical baseline and the variance and set a triggering condition using a combination of the statistical baseline and a certain proportion of the variance. For instance, if the statistical baseline is determined to be three failed login attempts per day per entity, and the variance data specifies zero failed login attempts per day for an entity with the least amount of activities and 10 failed login attempts per day for an entity with the most amount of activities, anomaly definition module 446 may determine that five failed login attempts (statistical baseline of three plus 20 percent of variance of 10) per day per entity should be used for a triggering condition to ensure that an entity's activity involving more than five failed login attempts correspond to an increased security threat. The specific proportion of the variance (e.g., 20 percent) may be selected by a user (e.g., system administrator) or system (e.g., machine learning algorithm) based on historical data and may distinguish activity that is a threat from activity that is not a threat.

Entity activity monitoring component 450 may search events from source data 460A-Z to identify activity associated with an entity and may update a risk score when the activity of an entity is anomalous. According to some aspects of the present disclosure, rather than searching a very large number of events representing activities of all entities, entity activity monitoring component 450 may only focus on activities of the entities specified in the watch list. In particular, entity activity monitoring component 450 may utilize watch list data 432, data received from statistical analysis component 440 and risk scoring rules 434 to update risk scores associated with the entities specified in the watch list. Entity activity monitoring component 450 may access risk scoring rules 434 from scoring data store 430. Each risk scoring rule may include a search query, a triggering conditions and a risk modifier. Entity activity monitoring component 450 may process risk scoring rules 434 using an event querying module 452, a trigger evaluation module 454 and a risk modifier module 456.

Event querying module 452 may execute a search query associated with risk scoring rule 434 to produce a search result providing information about entity activity. In some implementations, event querying module 452 first identifies events associated with the activity of entities specified in the watch list, and then executes the search query against the identified events. Alternatively, search criteria of the search query may include one or more conditions that cause the search query to focus on the events pertaining to the activity of entities specified in the watch list. The search criteria may also limit the search query to events of certain types represented by one or more source data 460A-Z (e.g., login events 463, email events 461, etc.). The search criteria may also include other conditions to direct the search query to events that include information about a particular activity that can indicate anomalous behavior of an entity (e.g., login=failed, attachment type=confidential, etc.). As discussed above, the events may be represented by a data structure that is associated with a time stamp and comprises a portion of raw machine data (i.e., machine-generated data). Events can be derived from "time series data," wherein time series data comprise a sequence of data points that are associated with successive points in time and are typically spaced at uniform time intervals.

Trigger evaluation module 454 may analyze the result of a search query and determine whether the triggering condition is satisfied. A triggering condition can be any condition that is intended to trigger a specific action. In one example, a triggering condition may trigger an action indicating that every time search criteria are satisfied (e.g., every time a specific entity has a failed authentication attempt). In another example, a triggering condition may trigger an action when a number specifying how many times search criteria have been satisfied exceeds a threshold (e.g., when the number of failed authentication logins of a specific entity exceeds "5"). It should be noted that in some implementations, a portion of the trigger evaluation might be handled as part of the search query and not as part of the triggering condition evaluation. A triggering condition may be applied to a result produced by a search query that is executed by the system either in real time or according to a certain schedule. Whenever at least a portion of the search result satisfies the triggering condition, a risk score associated with a certain entity to which the portion of the search result pertains may be modified (e.g., increased or decreased).

According to some aspects of the present disclosure, the triggering condition is set based on the statistical baseline indicating normal entity activity. Alternatively, the triggering condition can be set based on the statistical baseline and the variance, as discussed in more detail herein.

Risk modifier module 456 is configured to create and update entity risk score data 436 associated with one or more entity. In one example, entity risk score data 436 may be a single metric (e.g., numeric value) that represents the relative risk of an entity in an environment over time. The entity risk score may be used to quantify suspicious behavior of an entity. Risk modifier module 456 may be associated with risk score ranges that map to entity states. In one example, an entity risk score of 20-29 is an informational score indicating that an analysis of the entity's activity was performed and it was determined that the activity posed no threat. A score of 40-59 may indicate that the activity is associated with a low threat level, a score of 60-79 may indicate that the activity is associated with a medium threat level, a score of 80-99 may indicate that the activity is associated with a high threat level, and a score of 100 or more may indicate that the activity is associated with a critical threat level.

Source data 460A-Z may include events that indicate entity activity within a computing environment. The events may be associated with (e.g., include) time stamps and a portion of raw machine data. The events may be stored as file entries (e.g., log file entries), database entries, or in any other form. In one example, the events may include event logs, transaction logs, message logs or other logs. As shown in FIG. 4, source data 460A-Z may be stored in separate data stores that are accessed by the system over a network connection (e.g., session). Yet, in other examples the source data may be distributed or consolidated into more or fewer data stores and may be local or remote (e.g., over network) to the one or more computing devices of aggregate and analysis system 400.

Source data 460A may be associated with an email server or email client and may contain email events 461. Email events 461 may include identification information, such as a source address, a target address, content of the email or a combination thereof. Email events 461 may be stored in an email log on a server, on a client or a combination thereof. An email event may indicate that an email is being sent, received, or relayed.

Email events 461 may include raw machine data generated by a machine, such as by email server or client, and may be formatted according to an email protocol, such as, Simple Mail Transfer Protocol (SMTP), Multi-Purpose Internet Mail Extensions (MIME), Internet Message Access Protocol (IMAP), Post Office Protocol (POP) or other message protocol. In other examples, email events 461 may be related to messages other than emails, such as for example, instant messages, text messages, multimedia messages or other social messages.

In one example, system 400 may search email events 461 to identify email activity of an entity. Email events 461 may include activity indicating that a particular entity has been using an email account associated with an organization (e.g., work email account) to send information to another email account, which may not be associated with the organization. The other email account may be associated with the entity (e.g., a personal email account) or may be associated with another entity (e.g., email account of a competitor). Although the entity may be permitted to send emails external to the organization, an influx of email activity may indicate the entity poses an increased threat to the organization and therefore the risk score may be increased. System 400 may utilize an entity risk scoring rule (e.g., correlation search) to identity when the email activity increases and increase the risk score of the entity accordingly.

Source data 460B may be associated with one or more network devices (e.g., router, switch, DNS server, firewall, proxy server) and may contain network access events 462. Network access events 462 may indicate activity of a particular entity by including identification information corresponding to a source network address, a target network address, content of a network message or a combination thereof. The network address may be any piece of network identification information that identifies an asset (e.g., entity device) or entity (e.g., entity account) such as for example, a Media Access Control (MAC) address, an Internet Protocol (IP) address, a Port Number or other information to identify an object on a network. Source data 460B may be generated by a network device or may be generated by another device while monitoring one or more network devices.

Network access events 462 may include data generated by a machine (e.g., network device) and may be formatted according to a networking protocol, such as for example, Simple Network Management Protocol (SNMP), DNS, Hyper Text Transfer Protocol (HTTP), Transmission Control Protocol (TCP), IP or other network protocol. Network access events 462 may include domain name system (DNS) events 466, web proxy events 467 or other types of events related to a computer communication network.

DNS events 466 may identify a DNS request received by a DNS server from a machine or a DNS response transmitted from the DNS server to the machine. The DNS event may include a time stamp, a domain name, an IP address corresponding to the domain name or a combination of thereof. The DNS events may indicate a remote resource (e.g., web site) a particular entity is accessing, and therefore may indicate an entity's activity pertaining to web access.

In one example, system 400 may search DNS events 466 to identify activity of a particular entity. The machine data within the DNS events (e.g., domain names and IP addresses) may be used to identify when and how often an entity is accessing domains external to the organization, which may include email domains (e.g., gmail.com, mail.yahoo.com, etc.). System 400 may utilize an entity risk scoring rule to identity when DNS activity increases and correspondingly increase the risk score of the entity.

Web proxy events 467 may also indicate the remote servers accessed by an entity and may include information pertaining to the content of the information being transmitted or received. In one example, system 400 may aggregate and analyze web proxy events 467 to identify web upload activity of a particular entity. The machine data within a web proxy event (e.g., domain names and content) may be used to identify what information is being transmitted (e.g., uploaded) and how often an entity is transmitting data external to the organization (e.g., by using dropbox.com, salesforce.com, etc.). System 400 may utilize an entity risk scoring rule to identity when web activity increases, and may correspondingly increase the risk score of the entity.

Source data 460C may be associated with an authentication server or authentication client and may store login events 463. Login events 463 may include time stamps and data generated by a machine, such as for example, device or other authentication device. The machine data may relate to an authentication protocol, e.g., a Lightweight Directory Authentication Protocol (LDAP), a Virtual Private Network (VPN) protocol, a Remote Access System (RAS) protocol, Certificate Authority (CA) protocol, other authentication protocols or a combination thereof. Login events 463 may include local login events 463 and remote login events 463 or other type of login events.

Login events 463 may relate to local login events or remote login events. A local login event may indicate activity pertaining to an entity accessing a local resource, such as when an entity logs into a desktop computer in the vicinity (e.g., geographic area) of the entity. A remote login event may relate to an entity logging into a remote resource, such as when an entity logs into an organization from home through a VPN. Both types of logins may utilize credentials provided by the entity. The credentials may include an entity identifier, a password, a digital certificate or other similar credential data. Login events 463 may store the time the entity initiated or terminated a connection and the credentials or a portion of the credential used to login.

In one example, system 400 may search login events 463 to identify when multiple entities log into resources using the same credentials. This may indicate that the entity is sharing its credentials with another entity (e.g., an executive providing credential to an assistant) or that the credentials have been compromised (e.g., hacker). System 400 may utilize an entity risk scoring rule to identity when activity of an entity involves sharing credentials which may warrant that the risk score of the entity be increased.

In another example, system 400 may search login events 463 to identify when it appears that activity of the entity is impossible or implausible based on the laws of physics or known entity behavior. One such scenario may occur when an entity remotely logs into one or more resources from multiple geographic locations and the logins may be separated by a duration of time that would not allow the entity to travel between the geographic locations, for example, an entity logs in from a location in the U.S. and 5 minutes later the same entity logs in from a physical location in Russia. It is not plausible or possible for an entity to travel this far in such a short duration of time. As a result, the system may determine that this activity is suspicious. System 400 may utilize an entity risk scoring rule to identity when activity of an entity exhibits "impossible travel" and may update the risk score of the entity.

Source data 460D may be associated with a document system and contain document access events 464. Source data 460D may be stored on a client machine, a server machine or a combination of both. In one example, source data 460D may include a document access log file that is stored on a machine that hosts documents (e.g., network share) or on a machine that is accessing the documents (e.g., entity machine).

Document access events 464 may include machine data that identifies information pertaining to an entity's access of a document. Accessing a document may include viewing the document, copying the document, modifying the document or other action related to a document. The document may be a document with textual information (e.g., text documents, spread sheets), images (e.g., pictures or videos), encryption data (e.g., encryption keys), other information or a combination thereof. Document access events 464 may include information about the document, such as metadata related to the document's name, size, creation data, previous access time or other document data. Document access events 464 may also indicate a source location of the document and a target location of the document when the document is moved or copied. These locations may correspond to a local storage device (e.g., hard drive, solid state drive), a remote storage device (e.g., network attached storage (NAS)), a portable storage device (e.g., compact disk (CD), universal serial bus (USB), external hard drive or other storage device.

In one example, system 400 may search document access events 464 to identify how, where and when an entity accesses documents. Although an entity may be permitted to access the documents, the access may still be associated with suspicious behavior, for example, if an employee is copying data from a network location that is not associated with his or her department during off hours (e.g., 3 am on a Sunday), it may be suspicious. If this late-night activity is increasing in frequency, that may make the activity to look even more suspicious. System 400 may identity this or other types of activity by using entity scoring rules (e.g., correlation search), which is discussed in more detail in regards to FIG. 5.

Source data 460Z may include physical access events 465 that indicate activity related to the physical presence of an entity. Source data 460Z may be related to a security terminal device, a proximity device or other similar device that identifies an entity or something in the possession of the entity (e.g., badge, mobile phone) to establish the physical location of an entity. A security terminal device may identify the physical credentials of an entity, such as an identification card (e.g., photo badge), a radio frequency identification card (e.g., smart card), biometric information (e.g., finger print, facial, iris, or retinal information), or other similar physical credentials. The security terminal device may be associated with an authentication server and the authentication server may be the same or similar to the authentication server generating source data 460C (e.g., login server) or it may be a different authentication server. In one example, source data 460Z may be a log file that stores physical access events 465.

Physical access events 465 may indicate the physical activity of an entity, such as for example, the physical location of the entity at a security checkpoint or within an area accessible via the security checkpoint. The physical location may be a geographic location (e.g., an address or geographic coordinates) or a relative location (e.g., server room, classified document storage room). Physical access events 465 may include time stamps and raw machine data pertaining to the physical credentials of the entity and the physical location of the entity at an instant in time or during a duration of time.

In one example, system 400 may search physical access events 465 to identify when and where an entity is located (e.g., a relative location or geographic location). System 400 may identify the entity's location by monitoring the entity's activity using an entity scoring rule (e.g., correlation search).

Figure 5:
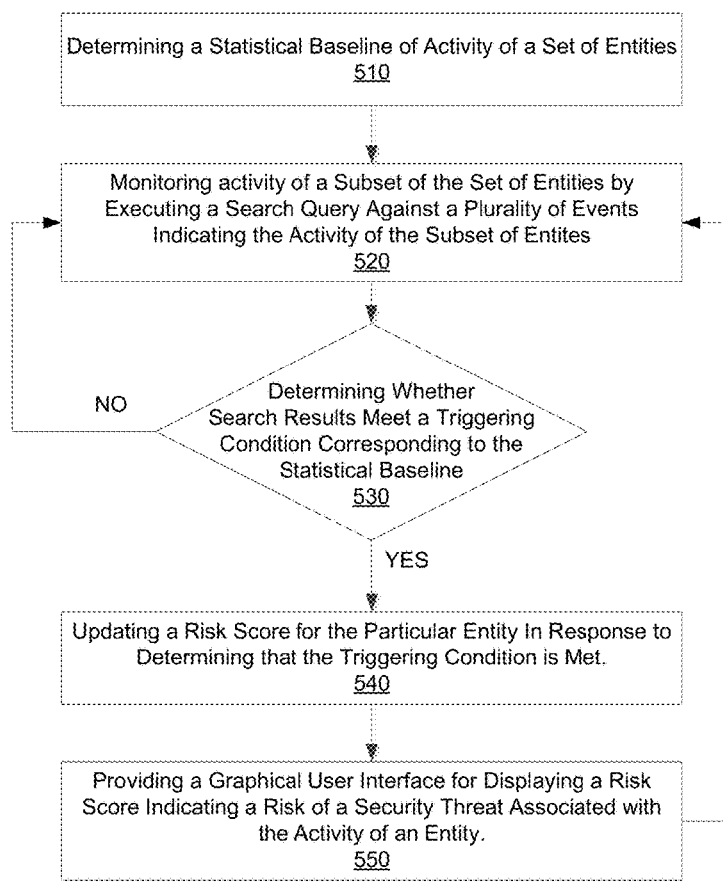
FIG. 5 depicts a flow diagram of an exemplary method for assigning risk scores to entities based on evaluating triggering conditions, in accordance with one or more aspects of the present disclosure.

FIG. 5 depicts a flow diagram of one illustrative example of a method 500 for aggregating and analyzing events indicating activity of one or more entities and updating entity risk scores to reflect the security threat of the entities. Method 500 and each of its individual functions, routines, subroutines, or operations may be performed by one or more processing devices of one or more computer devices executing the method.

For simplicity of explanation, the methods of this disclosure are depicted and described as a series of acts (e.g., blocks). However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by entity activity monitoring component 450 and statistical analysis component 440 as shown in FIG. 4.

Method 500 may begin at block 510 when the processing device performing the method may determine a statistical baseline of activity of a set of entities. As discussed above in regards to baseline module 442 of FIG. 4, the statistical baseline may represent the typical or normal activity over a predetermined duration of time. The activity may pertain to a set of entities (e.g., activity of peer group) or a subset of the entities (e.g., entities on the watch list) or to an individual entity (e.g., historic behavior). In one example, the statistical baseline may be based on an average amount of activity across the set or subset of entities or the median amount of activity of the subset or set of entities. Determining a statistical baseline may include executing a search query against a plurality of events indicating the activity of the set of entities. The plurality of events may include events related to a specific type, a subset of types or all types. In some implementations, executing the search query may include applying a late-binding schema to the plurality of events, where the late-binding schema is associated with one or more extraction rules defining one or more fields in the plurality of events. When determining the statistical baseline, the processing device may also determine or calculate the variance of activity across the set of entities as discussed in regards to variance module 444 of FIG. 4.

At block 520, the processing device may monitor activity of a subset of the set of entities by executing a search query against a plurality of events that may indicate the activity of the subset of entities. The subset of entities may correspond to one or more of the entities on the watch list or may correspond to all of the entities included on a watch list. The search query may be executed against events of one or more types. In one example, search criteria of a search query may identify events of a specific type, such as for example, email events. In another example, the search query may identify multiple event types and events of the multiple types may be searched via multiple separate instances of the search query or by a single search that spans all of the source data identified. In some implementations, executing the search query may include applying a late-binding schema to the events, where the late-binding schema is associated with one or more extraction rules defining one or more fields in the events.

The search query may include search criteria (e.g., keywords) that correspond to the entity and may directly identify or indirectly identify one or more entities. Search criteria that directly identify an entity may include identification information that is uniquely associated with an entity, for example, the search criteria may directly identify an entity by including an entity name, an email address, entity credentials (e.g., login or physical credentials) or other identification information specific to the entity. Search criteria that indirectly identify an entity may include identification information that does not in itself identify an entity (e.g., does not always uniquely identify an entity), but may identify the entity when combined with additional correlating information. For example, an IP address may change over time and therefore it may indirectly identify an entity.

To correlate an IP address (e.g., indirect identification information) to an entity account (e.g., direct identification information), the processing device may use the IP address along with dynamic host configuration protocol (DHCP) lease information and entity login information (i.e., additional correlating information). The processing device may correlate an IP address to an entity account by, for example, correlating an IP address with a host name by using a DHCP event. The DHCP event may link an IP address with a machine name. A processing device may use the machine name to identify an entity account that was logged in at that time and the entity account may uniquely identify the entity. Therefore, the correlation may be summarized as follows: IP address→Host Name→Entity Account→Entity. The correlation may be performed prior to, during, or after a search query is executed.

The processing device may execute the search query or initiate the execution of the search query and may receive search results in response. The search query and corresponding results (e.g., data set) may pertain to an individual entity (e.g., a single entity) or multiple entities, such as for example, all entities within the subset (e.g., all watch list entities). In one example, the search results may include one or more events that correspond to the search criteria. In another example, the search results may include information derived from the events as opposed to the events themselves. For example, if the search criteria correspond to multiple events, the search results may include, for example, a numeric value representing the quantity of events (e.g., 5 matching events), a change in the quantity of events (e.g., 10 more than previous search), a representative event, information extracted from the events, or combination thereof.

At block 530, the processing device may determine whether the search results meet a triggering condition corresponding to the statistical baseline. The triggering condition may include one or more triggering criteria and the triggering criteria may include a threshold. The threshold may identify an upper limit or a lower limit. When the threshold is an upper limit, an action may be triggered when the search results exceed the threshold. When the threshold is a lower limit, an action will be triggered when the search results fall below the threshold (i.e., exceed in a negative direction). Those skilled in the art would appreciate that other ways of representing a threshold can be utilized.

The trigging condition may correspond to the statistical baseline when the triggering criteria are based on or determined in view of the statistical baseline. In one example, a value associated with the statistical baseline (e.g., median value, average value) may function as the threshold. For example, if the statistical baseline indicates a peer group of entities is associated with transmitting 2 gigabits (Gb) of data per day over a VPN connection, the threshold may be set to 2 Gb. When the search results indicate a particular entity exceeds the 2 Gb threshold, the triggering criteria may be met or satisfied. In this situation, the triggering condition may be satisfied when the search result indicates that the activity of the particular entity exceeds the statistical baseline. In another example, the triggering condition may be satisfied when the search results indicate that the activity of the particular entity exceeds the statistical baseline by a predetermined portion of the variance. In this situation, the triggering condition may not be satisfied when the results exceed the average or median value but rather may be based on a proportion of the variance, for example, set the triggering criteria (e.g., threshold) to a value that is above 75% of the variance (e.g., upper quartile).

At block 540, the processing device may update (e.g., assign) a risk score for the particular entity in response to determining the triggering condition is met. The risk score may indicate a risk of a security threat associated with the activity of the particular entity. A risk score may be created and initiated to a zero, null or some default value, and updating the risk score may involve assigning a new risk score, increasing the current score, decreasing the current score, accessing a current score to calculate a new risk score or performing other operations on the risk score.

The processing device may determine the amount by which the risk score should be modified by accessing a risk scoring rule. The risk scoring rule may define a search query, the triggering condition and a risk modifier. The risk modifier may specify an amount by which to adjust the risk score of the particular entity when the triggering condition is satisfied. In one example, the risk modifier may be a predetermined value (e.g., a static value) which may be included within the text string of the search processing language, as will be discussed in more detail below. When the triggering condition is satisfied, the risk score of an entity may be modified (e.g., increased or decreased) by an amount specified by the predetermined value. In another example, the risk modifier may be a dynamic risk score modifier that utilizes a dynamic risk scoring calculation (e.g., a function) that takes into account information external to risk scoring rule, such as for example, the search results. In this latter situation, the risk modifier may vary depending on the difference (e.g., delta) between the statistical baseline and the search results. The difference may be based on the variation of a set of data values of the statistical baseline. In one example, the variation may be measured using standard deviations above a statistical baseline value (e.g., median, average), and a search result value in the first standard deviation above the statistical base unit (e.g., median) may be associated with an increase of a first quantity (e.g., 10 units), a second standard deviation above the statistical baseline unit may be associated with an increase of a second quantity (e.g., 25 units) and a third standard deviation above the statistical baseline value may be associated with an increase of a third quantity (e.g., 50 units). The units may be a dimensionless value for quantifying a risk an entity imposes on an organization and the first, second and third quantity may be identified by the risk scoring rule or determined using a calculation specified by the risk scoring rule.

Risk scores may be associated with entities on the watch list as well as entities not on the watch list. In some implementations, the risk score may be weighted based on one or more characteristics of a particular entity. For example, a weighted risk score may depend on the watch list status of a particular entity (e.g., whether an employee is on or off the watch list), the watch list category (e.g., whether an employee has received a termination notice) or a combination of both.

The risk scores may also be used to add an entity to a watch list. In one example, when processing device is determining the statistical baseline it may identify one or more entities with activity that exceeds the normal activity and may associate a risk score to these entities. In one example, the processing device may add an entity to the subset of entities (e.g., watch list) in response to determining that the risk score of the entity exceeds a risk score threshold value. The risk score threshold value may be a fixed value or may be relative to other entitles in a peer group, for example, the risk score threshold may be related to the statistical baseline (e.g., average, medium) of risk scores.

At block 550, the processing device may provide a graphical user interface (GUI) for displaying the risk score associated with an entity within the subset of entities. FIGS. 6-8 provide exemplary GUIs for presenting risk scoring information and are discussed in more detail below. In addition to GUIs for displaying the risk scores, the processing device may also cause display of another GUI to enable a user to create and modify the subset of entities whose activity is being monitored (e.g., the watch list).

Responsive to completing the operations described herein above with references to block 550, the processing device may branch to block 520 and continue to monitor the activity of the entities. In other examples, processing device may complete method 500, at which point method 500 may be re-executed after a predetermined duration of time in a manner similar to a scheduled job.

Method 500 may be used to search multiple different types of events. As discussed above with respect to FIG. 4, the events may include email events, web proxy events, DNS events, login events, etc. Some or all of these events may be aggregated and analyzed to determine risk scores using risk scoring rules. A risk scoring rule may be an instance of a correlation search and may include a search query, a triggering condition and a risk scoring modifier. In one example, there may be a separate risk scoring rule for each of the following events: emailing, web uploads, accessing non corporate web site, simultaneous logins, impossible travel, and other similar use cases. In another example, multiple (e.g., all) risk scoring rules may be combined into a single risk scoring rule (e.g., an aggregate risk scoring rule).

An exemplary email risk scoring rule may search email events to monitor emailing activity of a particular entity and may trigger an update to the entity's risk score when the entity's email activity, for example, emails sent to an email address external to an organization, exceeds a threshold quantity of data (e.g., 3 gigabytes (GB) per day). As discussed above, that threshold may be based on the statistical baseline. An exemplary web upload risk scoring rule may request that web proxy events be searched to monitor web uploads of a particular entity, and an update to the particular entity's risk score be triggered when the entity's web activity related to transferring data to a domain external to an organization uploads exceeds a threshold quantity of data (e.g., gigabytes (GB) per day). An exemplary risk scoring rule for accessing websites external to an organization may request that DNS events be searched to monitor web browsing activity of a particular entity, and an update to the particular entity's risk score be triggered when the entity's web browsing activity, for example, the quantity of web sites accessed that are external to an organization, exceeds a threshold quantity of data (e.g., quantity per day).

An exemplary risk scoring rule for simultaneous credential use may be used for searching login events to monitor the login activity of a particular entity, and for triggering an update to the particular entity's risk score when the particular entity is associated with a set of credentials being shared by multiple entities of an organization, for example, an executive and an assistant are using the same login credentials. Another exemplary risk scoring rule may be used to identify unlikely travel (e.g., impossible travel) by searching remote login events to monitor remote login activity of the particular entity. The risk scoring rule my include a triggering condition, which causes the entity's risk score to be updated when the entity is associated with multiple remote logins from multiple geographic locations within a duration of time that is less than the time needed for the entity to travel between the geographic locations.

FIG. 6A depicts an exemplary GUI 601 for displaying and modifying a risk scoring rule. GUI 601 includes a search processing language region 603, rule information region 607, and an action region 609. Search processing language region 603 may display a textual string that expresses the risk scoring rule (e.g., correlation search) in the search processing language. The textual string may include the search query, the triggering condition and the action. As illustrated, search processing language region 603 provides the following textual string:

|tstats 'summariesonly' sum(Web.bytes) as bytes from datamodel=Web where (Web.http_method="POST" OR Web.http_method="PUT") NOT ('cim_corporate_web_domain_search("Web.url")') by Web.user| 'drop_dm_object_name("Web")' xsfindbestconcept bytes from web_volume_1h_noncorp_eval_risk_score=case (BestConcept="extreme",80, BestConcept="high",50, BestConcept="medium",20,1==1,0) search risk score>0

The portion of the above textual string that states "web_volume_1h_noncorp" may specify the statistical baseline to be used for the triggering condition. The "web_volume_1h_noncorp" may be a unique identifier that corresponds to a specific statistical baseline that represents web volume (e.g. web traffic) between entities within an organization to web domains external to the organization (e.g., non-corporate domains). The portion of the textual string that states "eval_risk_score=case (BestConcept="extreme", 80, BestConcept="High", 50, BestConcept="Medium", 20) may specify that the entity scoring rule is incorporating a dynamic risk modifier as discussed above. In this instance, the dynamic risk modifier indicates multiple quantities (e.g., 80, 50 and 20), which means that if the search result satisfies a triggering condition, the risk score of an entity would be modified by a value of 80, 50 or 20 depending on how much the search result varies from the web_volume_1h_noncorp statistical baseline, wherein the value of 80 applies for the larger variation (e.g., search results corresponding to a third standard deviation), the value of 50 applies to the medium variation (e.g., search results corresponding to a second standard deviation) and the value of 20 applies to the lower variation (e.g., search results corresponding to a first deviation).

Rule information region 607 includes a name for the risk scoring rule, (e.g., "Web Uploads to Non-Corporate Sites by Users"), a software application context (e.g., "Identity Management") and a description of the rule (e.g., Alerts on high volume web uploads by an entity). Action region 609 illustrates multiple actions that may occur when the triggering condition of the risk scoring rule is satisfied. The actions may include a notable event, a risk modifier and other actions (e.g. send email, run a script, include in a feed). Action region 609 may include one or more radio buttons and text fields that allow a user to activate and modify values. Once a user modifies values using the radio buttons and text fields, the system may update the search processing language to reflect the changes. Upon completion, the risk scoring rule may be activated and executed to modify scoring rules for one or more entities.

As shown in FIG. 6A, a risk modifier action 611 is associated with a set of text fields 613A, 613B, and 613C. Text field 613A is a text field specifying how much a risk score of an entity should be adjusted. Text field 613B is a text field specifying what field in the search result indicates the entity that is associated with the risk score to be adjusted. Text field 613C is a text field indicating the type of object (e.g., entity type) that is associated with the risk score to be adjusted.

Figure 6B:
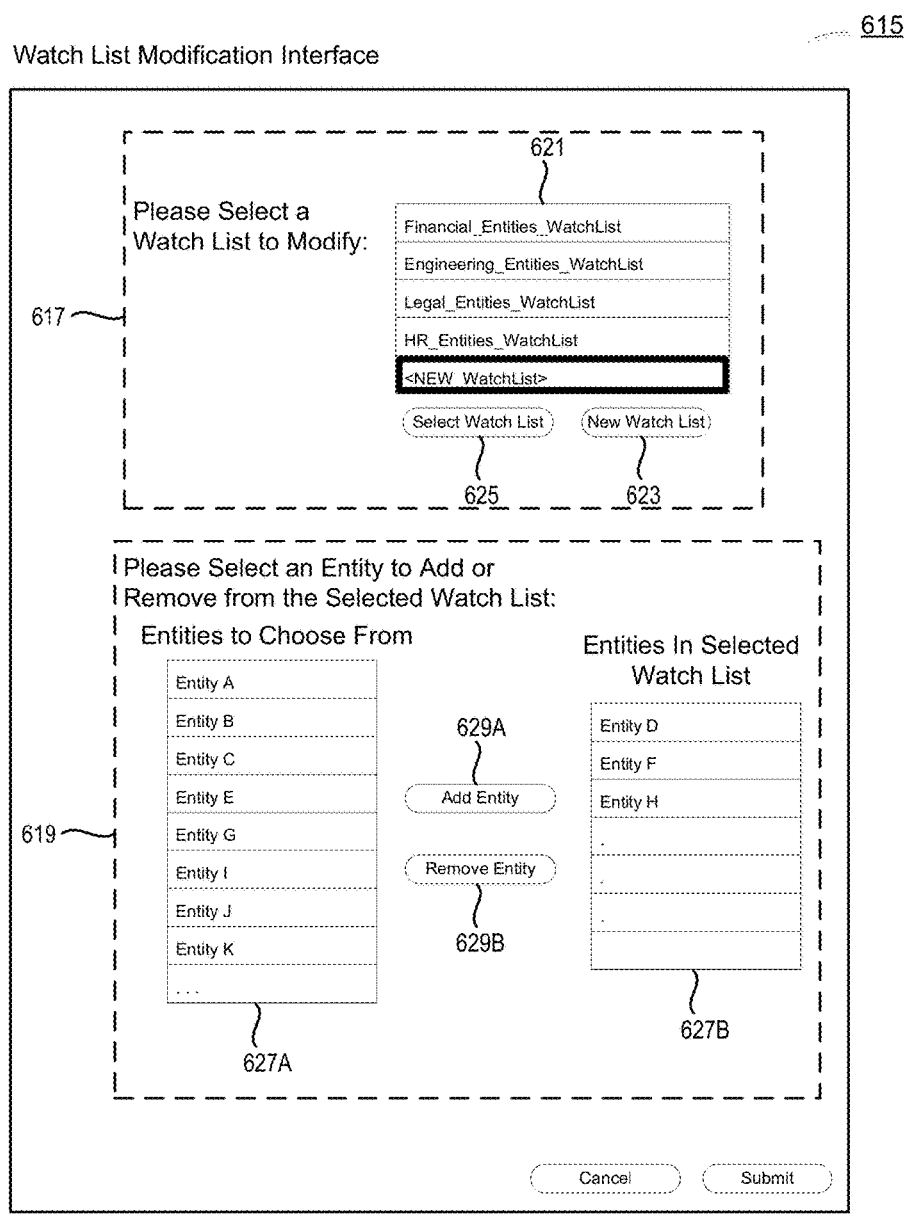
FIG. 6B schematically illustrates an exemplary GUI for selecting and modifying the subset (e.g., watch list) of entities, in accordance with one or more aspects of the present disclosure.

FIG. 6B schematically illustrates an exemplary GUI 615 for displaying one or more watch lists (e.g., subsets of entities) to enable a user to select or modify the entities that are included within the watch list, in accordance with one or more aspects of the present disclosure. GUI 615 may include a watch list selector region 617 and an entity selection region 619. Watch list selector region 617 may include a watch list table 621, a new watch list button 623 and a select watch list button 625. Watch list selector region 617 may include multiple watch lists that may correspond to different organizational units (e.g., finance, engineering, legal, HR). New watch list button 623 may allow the user to create a new watch list at which point it may be added to watch list table 621 so that a user may modify the name and content of the watch list. Select watch list button 625 may allow the user to select a watch list to display the entities identified by the watch list within entity selection region 619.

Entity selection region 619 may include multiple tables 627A and 627B. Table 627A may include the entities to choose from and table 627B may include the entities that are included within the currently selected list. Table 627A may include (e.g., list) all the entities that may be added to a watch list. This may include every entity within an organization or entities within a specific organization unit (e.g., Finance, Legal). A user may then select an entity and initiate the add entity button 629A to add the entity to table 627B so that the activity of the entity will be monitored. A user may also highlight an entity in table 627B and select the remove entity button 629B to remove the entity from the currently selected watch list.

Figure 7A:
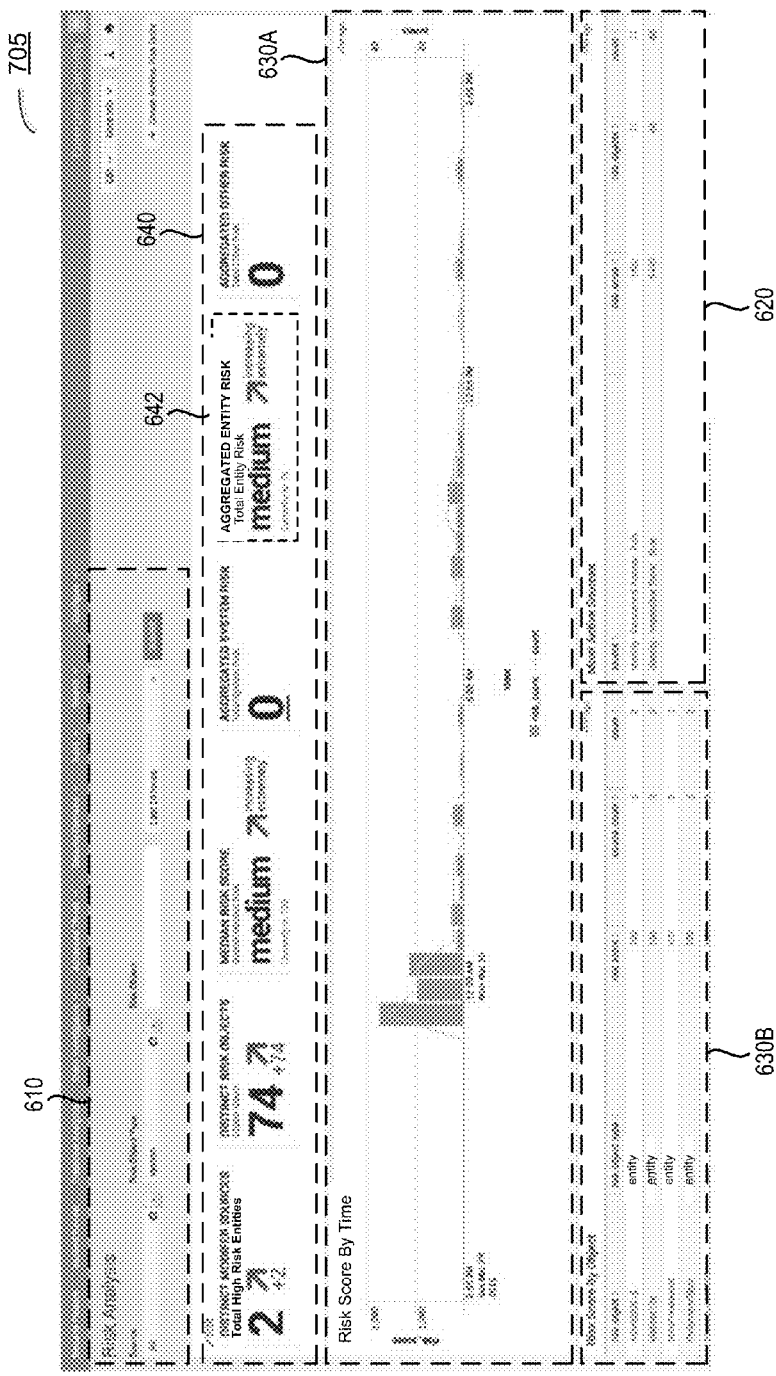
FIG. 7A schematically illustrates an exemplary GUI for displaying risk scores for multiple types of objects (e.g., both assets and entities), in accordance with one or more aspects of the present disclosure.
Figure 7B:
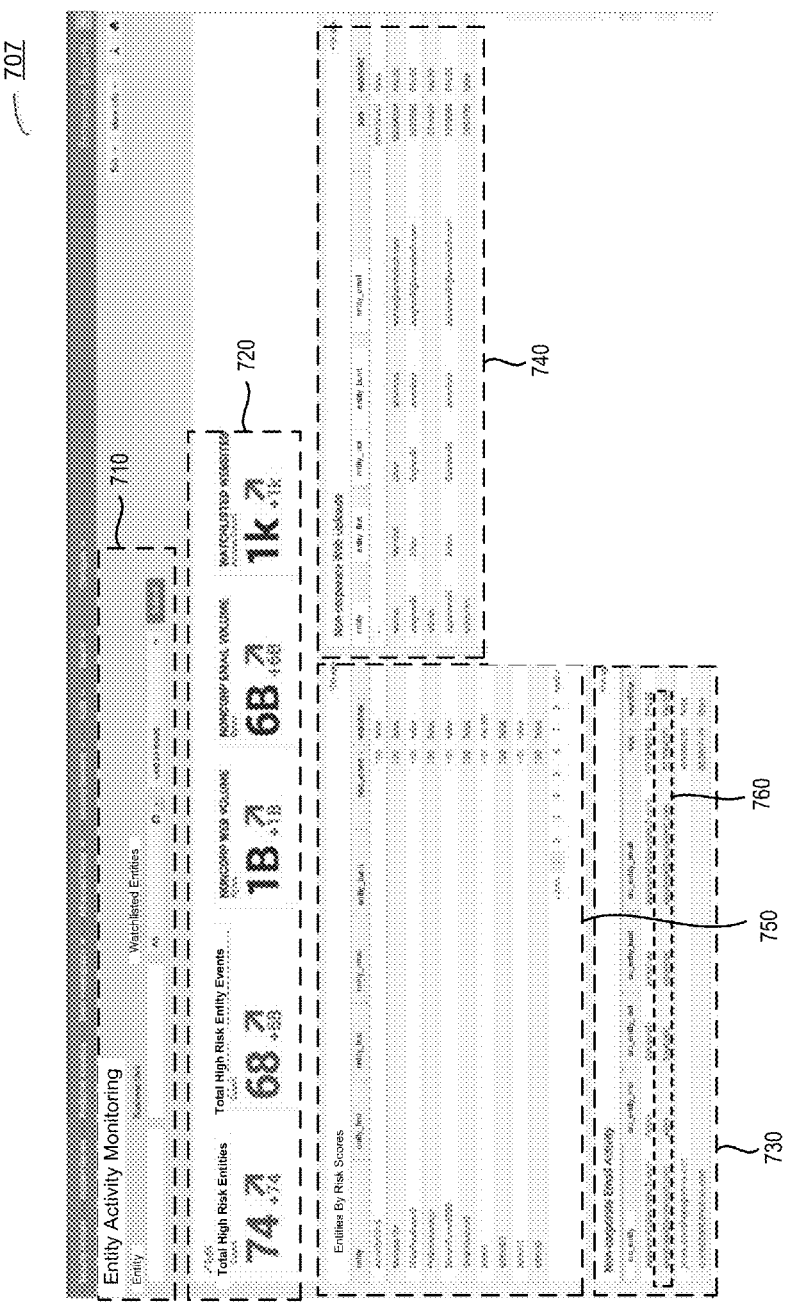
FIG. 7B schematically illustrates an exemplary GUI for displaying risk scores for entities, in accordance with one or more aspects of the present disclosure.
Figure 8:
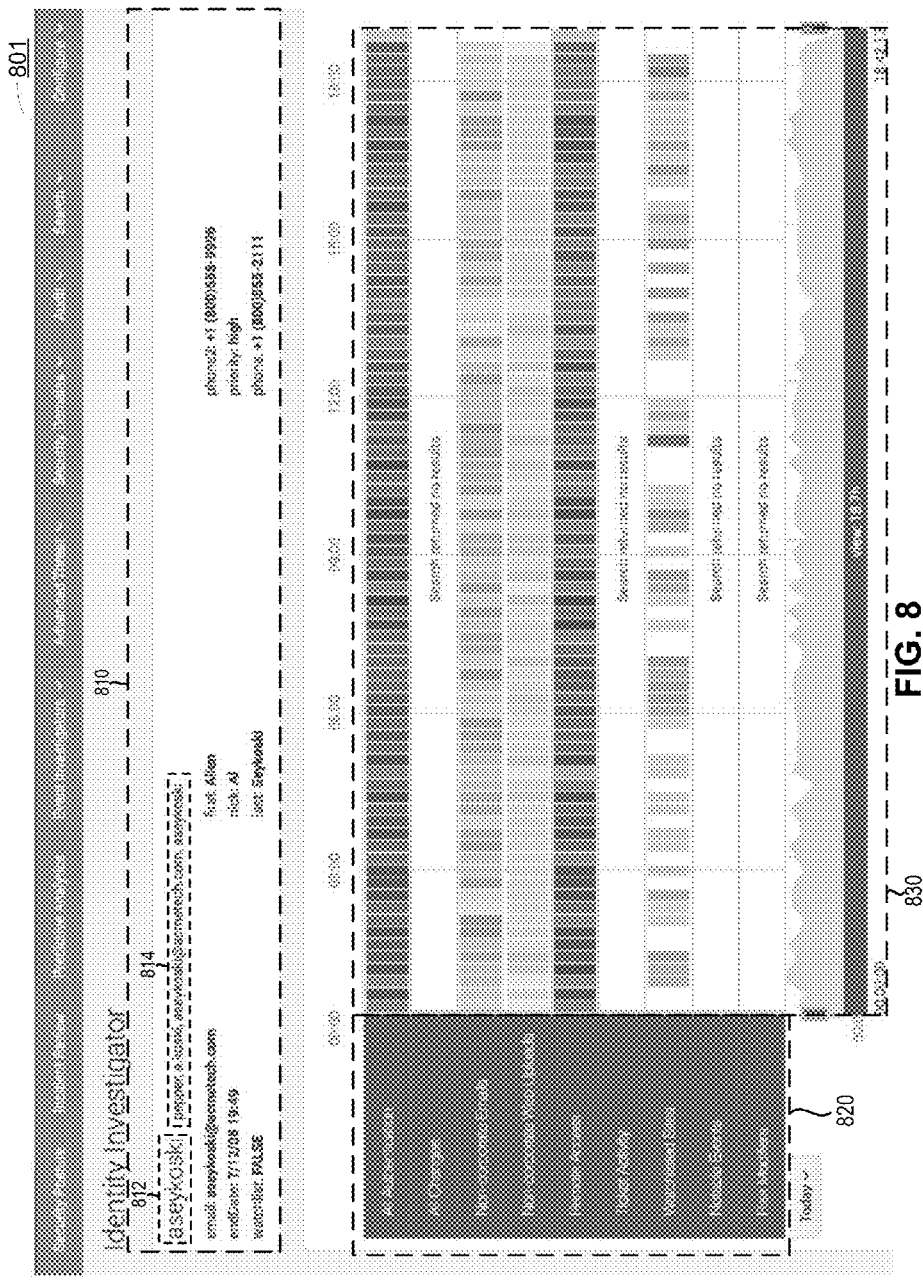
FIG. 8 schematically illustrates an exemplary GUI for displaying risk scores for a specific entity, in accordance with one or more aspects of the present disclosure.

FIGS. 7A, 7B and 8 depict multiple exemplary graphical user interfaces (GUI) 705, 707 and 801 for displaying activity related information. GUIs 705, 707 and 801 may be interconnected in that each graphical interface may be linked to the subsequent graphical interface and enable user to navigate from a broad dashboard view to a more granular dashboard view. For example, GUI 705 may display risk scores for multiple different object types (e.g., system objects and entity objects) and may include a portion that links to GUI 707. GUI 707 may display a dashboard specific to entity objects and display the aggregate risk scores and organize entities into categories based on risk score type (e.g., email, web uploads). GUI 707 may also display multiple entities with embedded links that enable a user to select a specific entity to navigate to GUI 801. GUI 801 may display the risk scores associated with the selected entity. GUIs 705, 707 and 801 will be discussed in more detail below with regards to FIGS. 7A, 7B, and 8.

Referring now to FIG. 7A, GUI 705 may provide a dashboard that summarizes risk score information for a plurality of different object types including system objects and entity objects. GUI 705 may include an object selector region 610, risk scoring rule activity region 620, risk score regions 630A and 630B, and key indicator region 640. Object selector region 610 may provide the user with options to select a specific risk scoring rule (e.g., emails, web uploads); a specific risk object type (e.g., system object, entity object); and duration of time (e.g., last 24 hours). When a user changes an option within object selector region 610, a user may select a submit button to initiate an adjustment to the amount of information being summarized throughout GUI 705. Risk scoring rule activity region 620 lists the active risk scoring rules, wherein an "active" risk scoring rule is one that has triggered a risk modifier in the preselected duration of time. The risk scoring rules are listed one per row and the columns identify the current risk score contributions of the rules and the number of objects that have had their risk scores modified.

Risk score region 630A and risk score region 630B may both provide risk score information, but may organize it in different ways. Risk score region 630A may organize the risk score by time and graphically represent the information using multiple overlying graphs. A first graph may be a bar graph that displays risk scores and a second graph may be a line graph that displays the cumulative counts. Risk score region 630B may organize the risk scores by entity and display them in a table format. Each row of the table may correspond to an entity and the columns may identify the type of object (e.g., entity), the risk score (e.g., 100), and the counts (e.g., 2).

Key indicator region 640 includes multiple portions that display key indicators for various security-related metrics, such as distinct risk objects and median risk scores. Each key indicator may include a title (e.g., median risk score), a trend indicator arrow and a metric value (e.g., +74). Key indicators are described in further detail in pending U.S. patent application Ser. No. 13/956,338 filed Jul. 31, 2013, which is incorporated by reference herein. Each of the key indicators may be linked to another graphical interface that provides more granular summary information. For example, aggregated entity risk portion 642 may link to GUI 707, such that when a user selects a point within the portion, it may navigate to GUI 707.

Referring now to FIG. 7B, GUI 707 may display a dashboard that summarizes risk scoring data of entity objects. GUI 707 may be more granular than GUI 705, which may include risk scoring data for both entity objects and asset objects. GUI 707 may include entity selector region 710, key indicator region 720, email activity region 730, web upload activity region 740 and entity list region 750. Entity selector region 710 may provide the user with options to select an entity, an organizational unit, and filter based on entities on a watch list and a duration of time (e.g., last 24 hours). When a user changes an option within entity selector region 710, a user may select a submit button to initiate an adjustment to the amount of information being summarized throughout GUI 707. Key indicator region 720 may include key indicators that are similar to the key indicator region 640, but may be related to the total number of high risk entities or the total number of high risk entity events.

Email activity region 730 and web upload activity region 740 may both include a table that lists the entities associated with high risk activity for a specified category. Email activity region 730 is associated with email risk scoring rules and ranks the entities based on the quantity of data they are transmitting via email. Web upload activity region 740 is associated with web upload risk scoring rules and ranks the entities based on the quantity of data they are uploading. Entity risk region 750 may be similar to email activity region 730 and web upload region 740 and may include a table that lists the entities, but entity risk region 750 may include the aggregate risk sores that incorporate the risk scores derived from multiple different activity types (e.g., email and web uploads). Each entity in the table may be linked to another graphical interface that provides more information for the entity. For example, entity 760 may link to GUI 801, such that when a user selects a point within the row, it may navigate the user to GUI 801.

Referring now to FIG. 8, GUI 801 may display the risk scores associated with the specific entity (e.g., aseykoski). GUI 801 may include an entity information region 810, activity region 820 and a graphical summary region 830. Entity information region 810 may include entity portion 812 and alias portion 814 and may display related information, such as first name, last name, nick name, phone numbers, email addresses. Entity portion 812 may identify the main entity account (e.g., aseykoski) and alias portion 814 may display related entity accounts that are related (e.g., aliases) to the main entity account. Activity region 820 and graphical summary region 830 may correspond to multiple activity categories and display the data specific to the specified entity. For example, the activity related to email and web uploads may be listed in activity region 820 and the corresponding graphs may be displayed in graphical summary region 830.

As described herein, the disclosure describes various mechanisms for monitoring activity of one or more entities and analyzing the activity to assess or quantify a security threat imposed by the entities to a party such as an organization and other similar body of individuals.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables an entity to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, an entity may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

Figure 9:
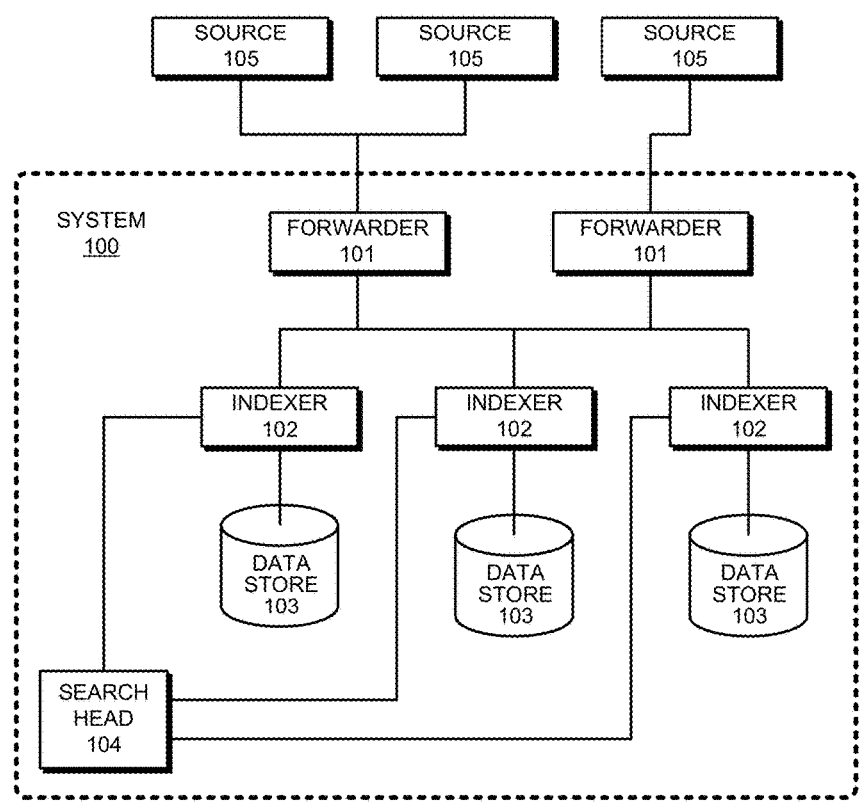
FIG. 9 presents a block diagram of an event-processing system in accordance with one or more aspects of the present disclosure.

FIG. 9 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 5-10 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Figure 10:
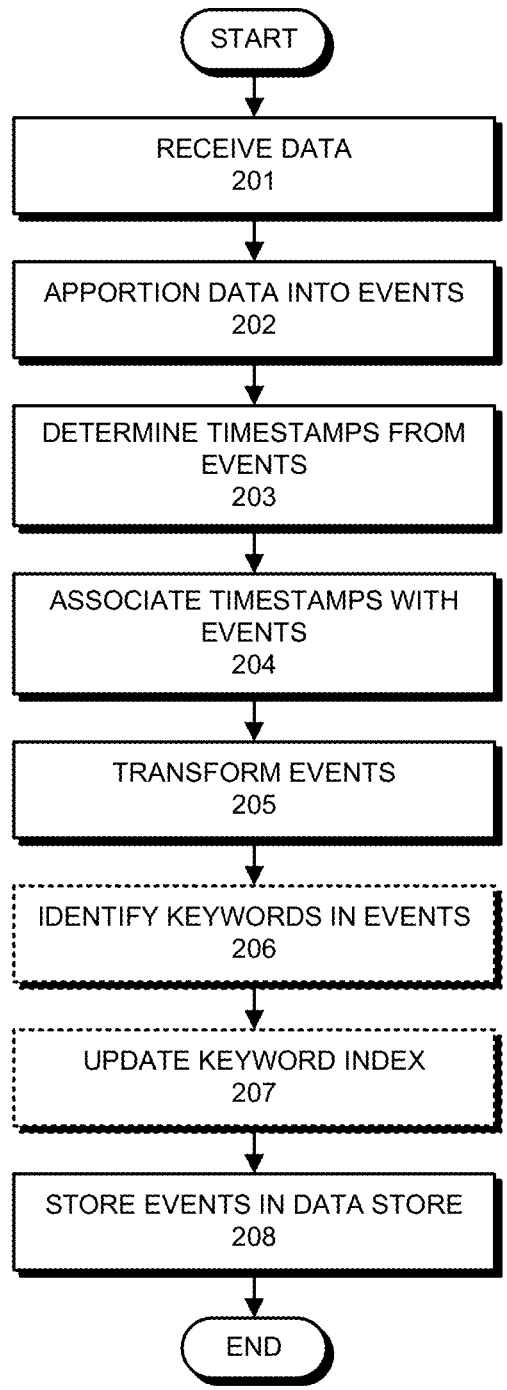
FIG. 10 presents a flowchart illustrating how indexers process, index, and store data received from forwarders in accordance with one or more aspects of the present disclosure.

FIG. 10 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, an entity can fine-tune or configure the rules that the indexers use to determine event boundaries in order to adapt the rules to the entity's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that an entity can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

Figure 11:
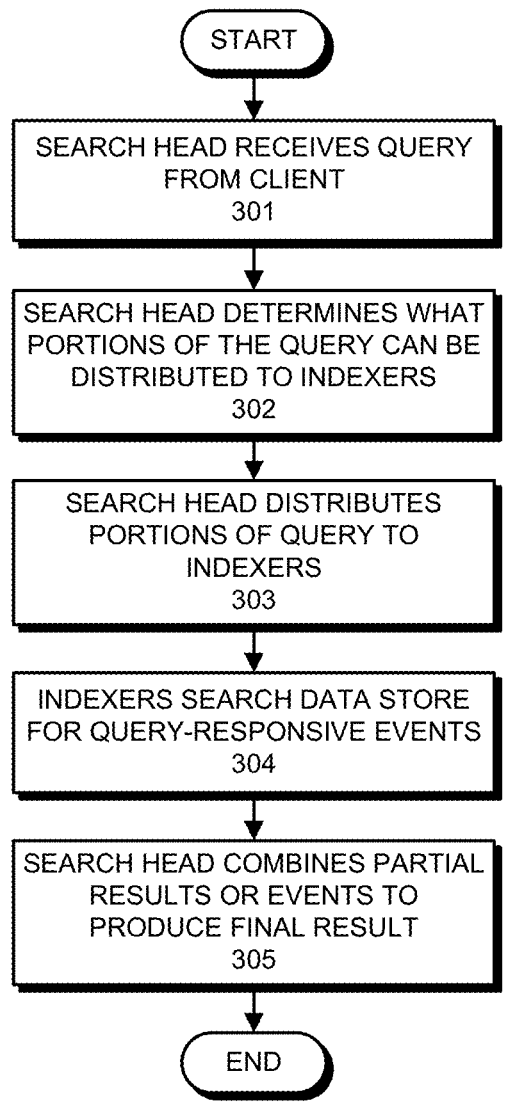
FIG. 11 presents a flowchart illustrating how a search head and indexers perform a search query in accordance with one or more aspects of the present disclosure.

FIG. 11 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

Figure 12:
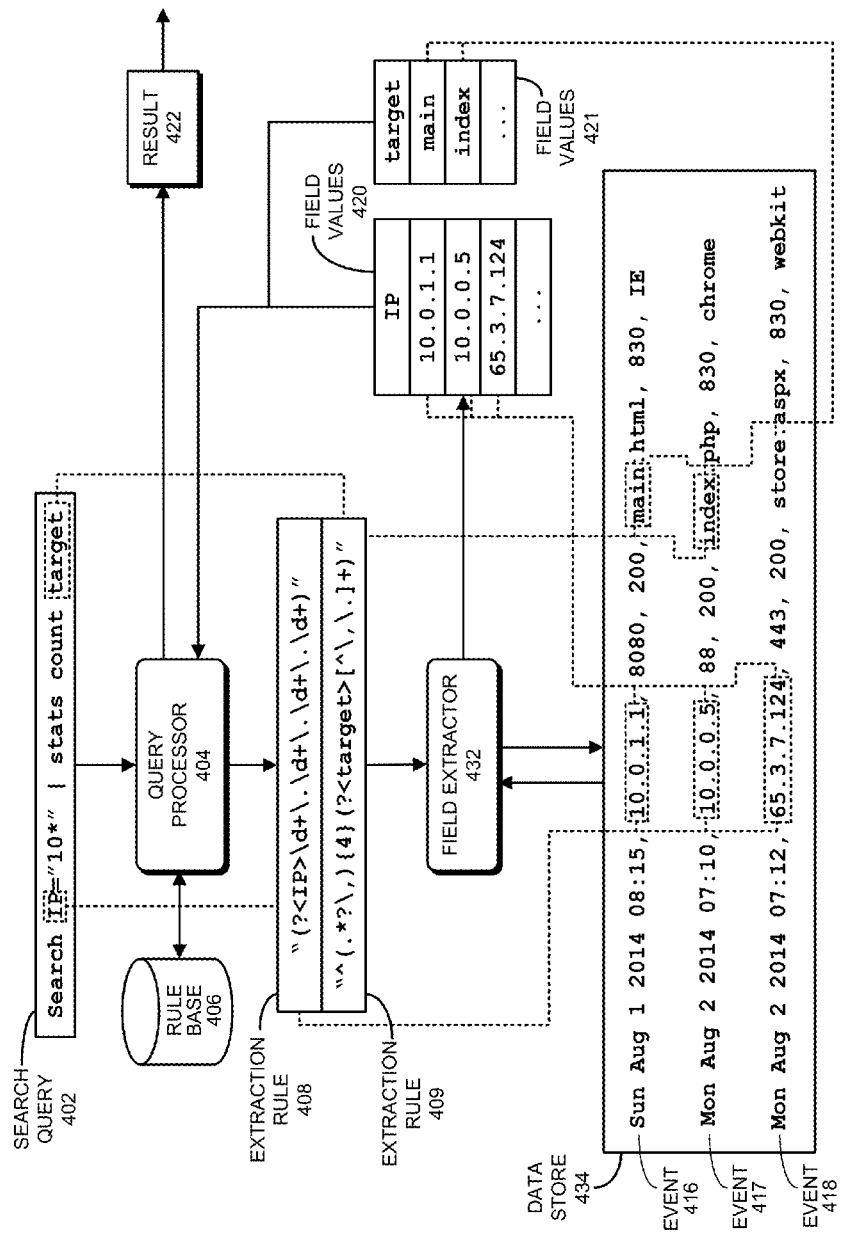
FIG. 12 presents a block diagram of a system for processing search requests that uses extraction rules for field values in accordance with one or more aspects of the present disclosure.

FIG. 12 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 12 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 434, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 12, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 432, which applies extraction rules 408-409 to events 416-418 in a data store 434. Note that data store 434 can include one or more data stores, and extraction rules 408-409 can be applied to large numbers of events in data store 434, and are not meant to be limited to the three events 416-418 illustrated in FIG. 12. Moreover, the query processor 404 can instruct field extractor 432 to apply the extraction rules to all the events in a data store 434, or to a subset of the events that have been filtered based on some criteria.

Next, field extractor 432 applies extraction rule 408 for the first command "Search IP="10*"" to events in data store 434 including events 436-418. Extraction rule 408 is used to extract values for the IP address field from events in data store 434 by looking for a pattern of one or more digits, followed by a period, followed again by one or more digits, followed by another period, followed again by one or more digits, followed by another period, and followed again by one or more digits. Next, field extractor 432 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 432 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 432 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

Figure 14A:
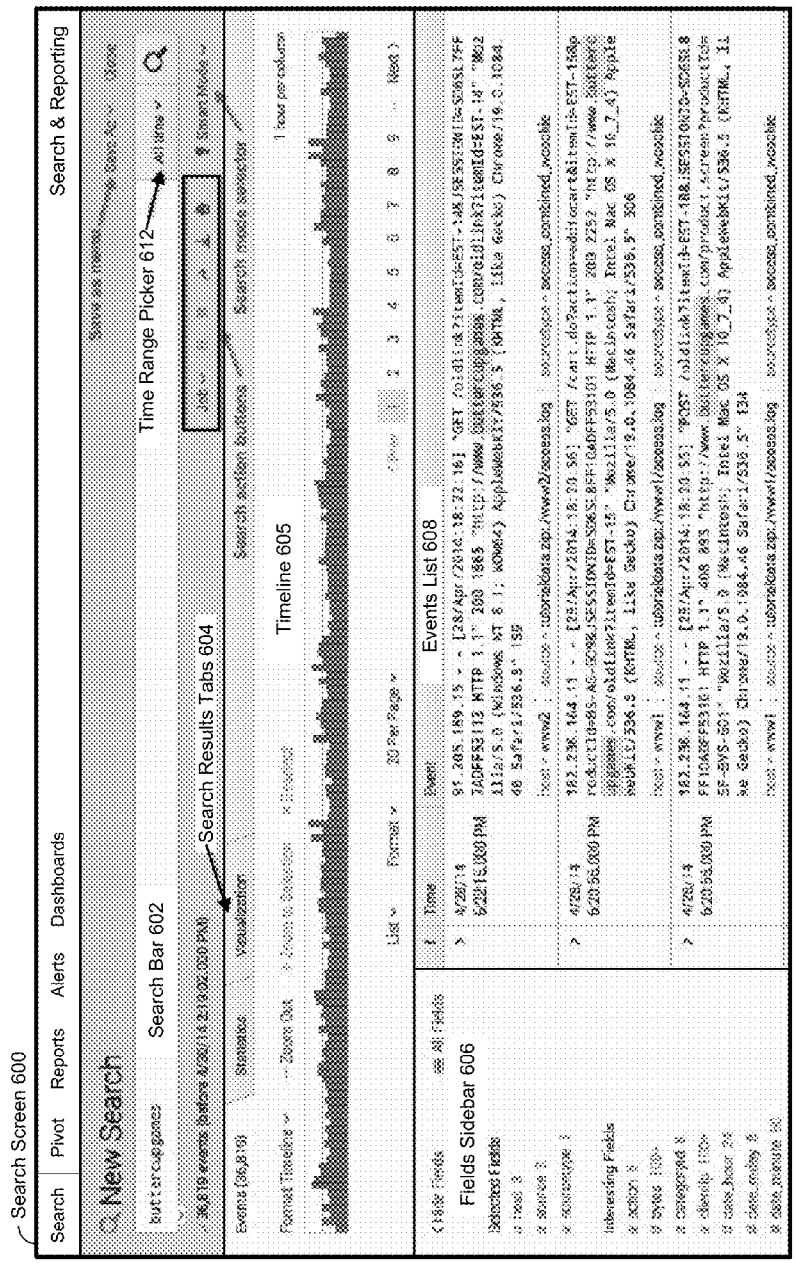
FIG. 14A illustrates a search screen in accordance with one or more aspects of the present disclosure.
Figure 14B:
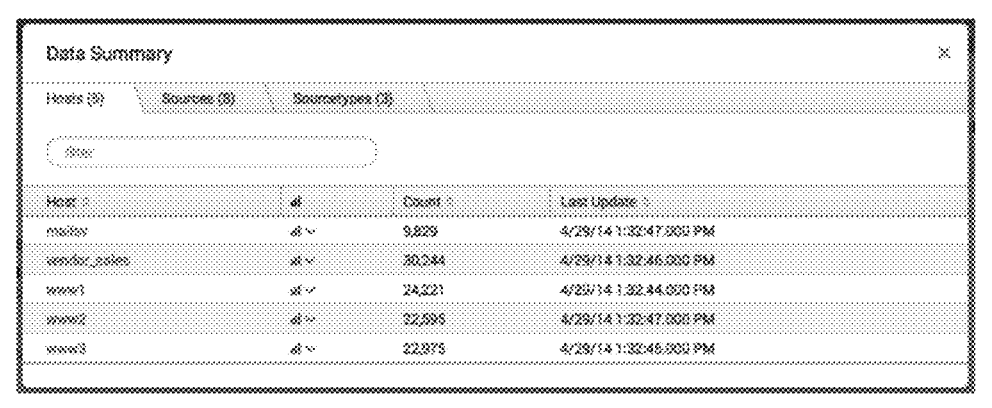

FIG. 14A illustrates an exemplary search screen 600 in accordance with the disclosed embodiments. Search screen 600 includes a search bar 602 that accepts entity input in the form of a search string. It also includes a time range picker 612 that enables the entity to specify a time range for the search. For "historical searches" the entity can select a specific time range, or alternatively a relative time range, such as "today," "yesterday" or "last week." For "real-time searches," the entity can select the size of a preceding time window to search for real-time events. Search screen 600 also initially displays a "data summary" dialog as is illustrated in FIG. 14B that enables the entity to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 14A displays a timeline graph 605 that graphically illustrates the number of events that occurred in one-hour intervals over the selected time range. It also displays an events list 608 that enables an entity to view the raw data in each of the returned events. It additionally displays a fields sidebar 606 that includes statistics about occurrences of specific fields in the returned events, including "selected fields" that are pre-selected by the entity, and "interesting fields" that are automatically selected by the system based on pre-specified criteria.

The above-described system provides significant flexibility by enabling an entity to analyze massive quantities of minimally processed performance data "on the fly" at search time instead of storing pre-specified portions of the performance data in a database at ingestion time. This flexibility enables an entity to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

To facilitate faster query processing, a query can be structured as a map-reduce computation, wherein the "map" operations are delegated to the indexers, while the corresponding "reduce" operations are performed locally at the search head. For example, FIG. 13 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 11, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

As described above with reference to the flow charts in FIGS. 6 and 7, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94307" in a "ZIP code" field of a set of events, wherein the entry includes references to all of the events that contain the value "94307" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by an entity, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,432,696, issued on Apr. 2, 2011.

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables an entity to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 15A:
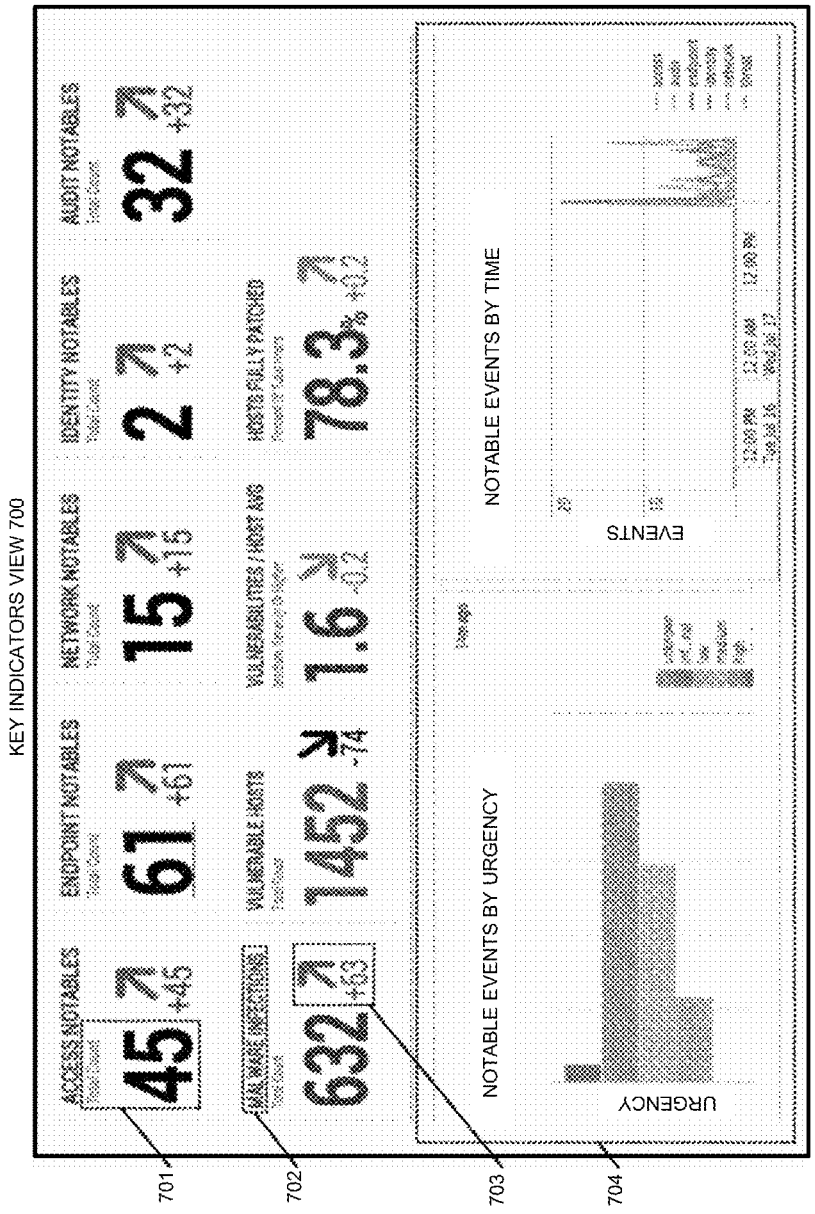
FIG. 15A illustrates a key indicators view in accordance with one or more aspects of the present disclosure.

The SPLUNK® APP FOR ENTERPRISE SECURITY provides various visualizations to aid in discovering security threats, such as a "key indicators view" that enables an entity to view security metrics of interest, such as counts of different types of notable events. For example, FIG. 15A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 15B:
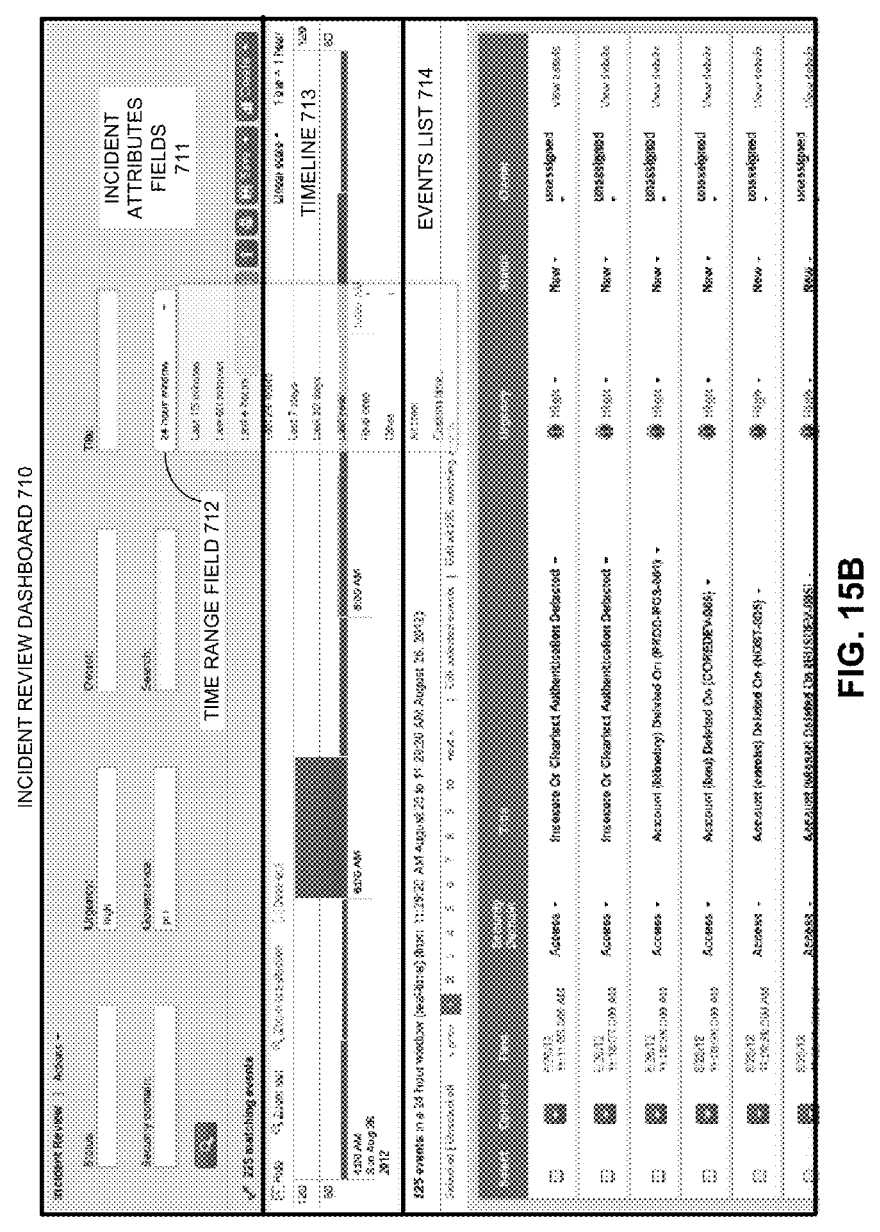

These visualizations can also include an "incident review dashboard" that enables an entity to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 15B illustrates an exemplary incident review dashboard 710 that includes a set of incident attribute fields 711 that, for example, enables an entity to specify a time range field 712 for the displayed events. It also includes a timeline 713 that graphically illustrates the number of incidents that occurred in one-hour time intervals over the selected time range. It additionally displays an events list 714 that enables an entity to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/Entity/IncidentReviewdashboard."

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables an entity to define such schemas.

Figure 15C:
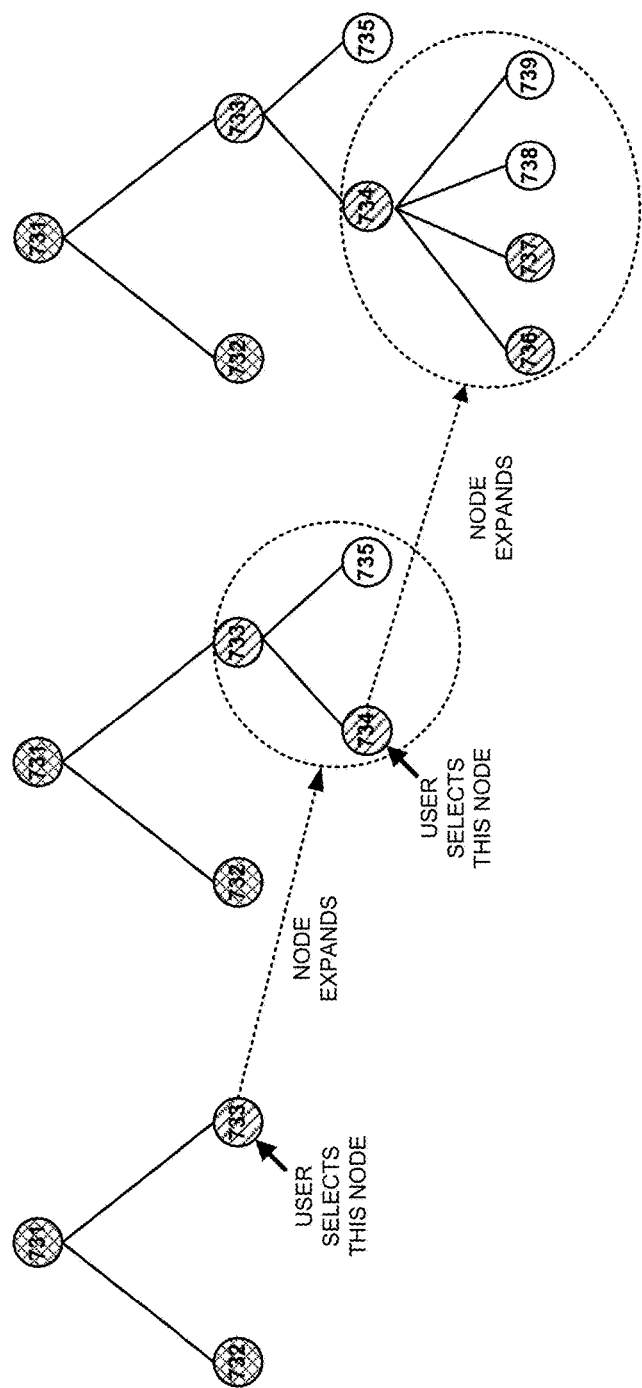
FIG. 15C illustrates a proactive monitoring tree in accordance with one or more aspects of the present disclosure.

The SPLUNK® APP FOR VMWARE® additionally provides various visualizations to facilitate detecting and diagnosing the root cause of performance problems. For example, one such visualization is a "proactive monitoring tree" that enables an entity to easily view and understand relationships among various factors that affect the performance of a hierarchically structured computing system. This proactive monitoring tree enables an entity to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 15C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables an entity to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 15D:
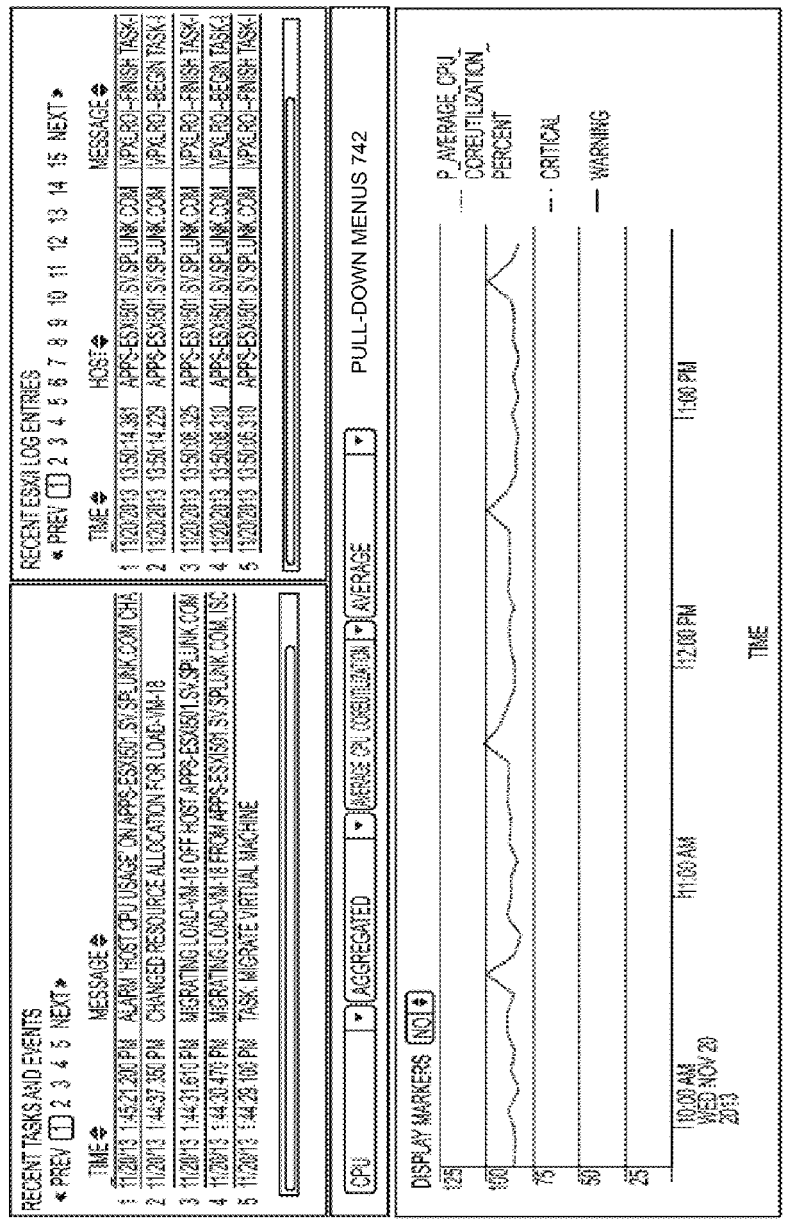
FIG. 15D illustrates a screen displaying both log data and performance data in accordance with one or more aspects of the present disclosure.

The SPLUNK® APP FOR VMWARE® also provides an entity interface that enables an entity to select a specific time range and then view heterogeneous data, comprising events, log data and associated performance metrics, for the selected time range. For example, the screen illustrated in FIG. 15D displays a listing of recent "tasks and events" and a listing of recent "log entries" for a selected time range above a performance-metric graph for "average CPU core utilization" for the selected time range. Note that an entity is able to operate pull-down menus 742 to selectively display different performance metric graphs for the selected time range. This enables the entity to correlate trends in the performance-metric graph with corresponding event and log data to quickly determine the root cause of a performance problem. This entity interface is described in more detail in U.S. patent application Ser. No. 14/167,316 filed on 29 Jan. 2014, which is hereby incorporated herein by reference for all possible purposes.

Figure 16:
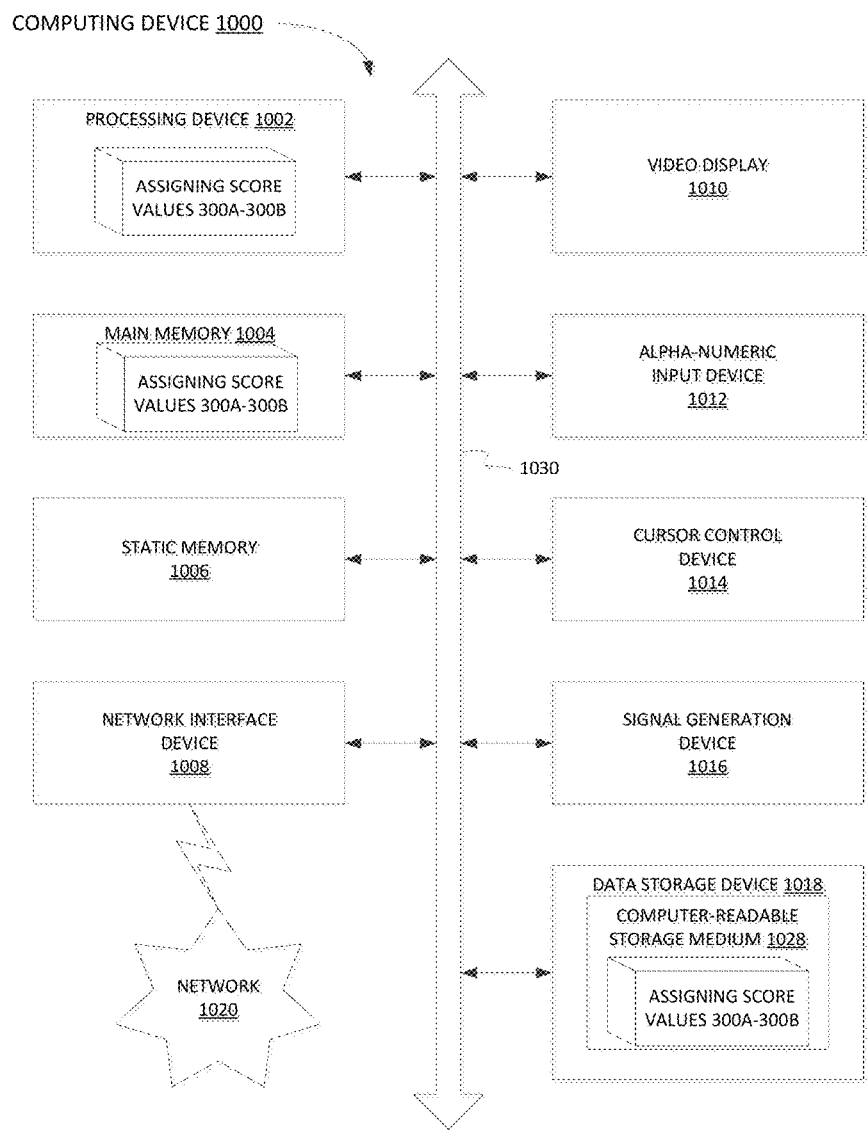
FIG. 16 depicts a block diagram of an exemplary computing device operating in accordance with one or more aspects of the present disclosure.

FIG. 16 illustrates a diagrammatic representation of a computing device 1000 within which a set of instructions for causing the computing device to perform the methods discussed herein may be executed. The computing device 1000 may be connected to other computing devices in a LAN, an intranet, an extranet, and/or the Internet. The computing device 1000 may operate in the capacity of a server machine in client-server network environment. The computing device 1000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computing device 1000 may implement the above described methods 300A-300B for assigning scores to objects based on evaluating triggering conditions applied to datasets produced by search queries.

The exemplary computing device 1000 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the methods 300A-300B for assigning scores to objects based on evaluating triggering conditions applied to datasets produced by search queries, in accordance with one or more aspects of the present disclosure.

The computing device 1000 may further include a network interface device 1008, which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the methods 300A-300B for assigning scores to objects based on evaluating triggering conditions applied to datasets produced by search queries, in accordance with one or more aspects of the present disclosure) implementing any one or more of the methods or functions described herein. Instructions implementing methods 300A-300B may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method comprising:
    identifying, from a set of entities to be monitored, a subset of the set of entities to be subjected to additional monitoring, based on user input received via a user interface; and
    performing the additional monitoring by:
        accessing a scoring rule that includes a search query and a score contribution, the score contribution corresponding to a score computation to be performed, when a triggering condition is satisfied, to compute a score of a particular entity that is part of or that interacts with an information technology environment;
        after said accessing the scoring rule, executing the search query against a plurality of events associated with activity of a set of entities that are part of or that interact with the information technology environment, wherein the search query produces a search result pertaining to activity of the set of entities, wherein each event of the plurality of events has a timestamp and includes machine data;
        determining whether the search result satisfies the triggering condition;
        responsive to determining that the search result satisfies the triggering condition, determining the score for the particular entity in the set of entities based on the score contribution, the score of the particular entity being indicative of an activity of the particular entity; and causing at least one of:
- display or transmission of the score or an update to the score of the particular entity, or
- a remedial action related to the activity of the particular entity.

2. The method of claim 1, wherein the score of the particular entity is a risk score representing a security risk associated the particular entity.

3. The method of claim 1, wherein the score contribution is a score modifier, and wherein determining the score for the particular entity comprises modifying the score for the particular entity based on the score modifier.

4. The method of claim 1, wherein identifying the subset of the set of entities to be subjected to additional monitoring comprises receiving user inputs specifying at least a portion of the subset of the set of entities to be subjected to additional monitoring.

5. The method of claim 1, further comprising causing display of a graphical interface (GUI) element that enables a user to select the subset of the set of entities for additional monitoring, wherein identifying the subset of the set of entities to be subjected to additional monitoring comprises receiving user inputs directed to the GUI element.

6. The method of claim 1, further comprising causing display of a graphical interface (GUI) element that enables a user to select and modify the subset of the set of entities for additional monitoring, wherein identifying the subset of the set of entities to be subjected to additional monitoring comprises receiving user inputs directed to the GUI element.

7. The method of claim 1, further comprising:
causing display of a graphical interface (GUI) element that enables a user to specify at least a portion of the scoring rule; and
receiving user inputs specifying at least a portion of the scoring rule, the user inputs being directed to the GUI element.

8. The method of claim 1, wherein the plurality of events comprise email events, and the activity of the particular entity is associated with emailing documents to an email address external to an organization.

9. The method of claim 1, wherein the plurality of events comprise web proxy events, and the activity of the particular entity is associated with transferring data to a domain external to an organization.

10. The method of claim 1, wherein the plurality of events comprise domain name system (DNS) events, and the activity of the particular entity is associated with accessing a quantity of web sites external to an organization, wherein the quantity exceeds a threshold derived from a statistical baseline.

11. The method of claim 1, wherein the plurality of events comprise login events and the activity of the particular entity is associated with a set of credentials being shared by multiple entities of an organization.

12. The method of claim 1, wherein the plurality of events comprise remote login events, and the activity of the particular entity is associated with multiple remote logins from multiple geographic locations within a duration of time, wherein the duration of time is less than the time needed for the particular entity to travel from between the multiple geographic locations.

13. The method of claim 1, wherein the plurality of events are derived from one or more of web access logs, email logs, DNS logs or authentication logs.

14. The method of claim 1, wherein the triggering condition is satisfied only when criteria of the triggering condition are satisfied at least a specified number of times by the plurality of events.

15. The method of claim 1, further comprising:
adding an entity to the subset of the set of entities in response to determining that the score of the particular entity exceeds a score threshold value.

16. The method of claim 1, further comprising determining a statistical baseline of activity of the set of entities, the statistical baseline being based on an average amount of the activity of the set of entities, wherein the triggering condition corresponds to the statistical baseline.

17. The method of claim 1, further comprising determining a statistical baseline, wherein determining the statistical baseline comprises:
accessing the plurality of events indicating the activity of the set of entities; and
determining a variance for the activity of the set of entities based on the plurality of events, wherein the triggering condition is satisfied when the search result indicates that the activity of the particular entity exceeds the statistical baseline by a predetermined portion of the variance.

18. The method of claim 1, wherein executing the search query comprises:
applying a late-binding schema to the plurality of events, the late-binding schema associated with one or more extraction rules defining one or more fields in the plurality of events.

19. A computer system comprising:
a network interface through which to communicate on a network; and
a processor coupled to the network interface and configured to execute operations including:
identifying, from a set of entities to be monitored, a subset of the set of entities to be subjected to additional monitoring, based on user input received via a user interface; and
performing the additional monitoring by:
accessing a scoring rule that includes a search query and a score contribution, the score contribution corresponding to a score computation to be performed, when a triggering condition is satisfied, to compute a score of a particular entity that is part of or that interacts with an information technology environment;
after said accessing the scoring rule, executing the search query against a plurality of events associated with activity of a set of entities that are part of or that interact with the information technology environment, wherein the search query produces a search result pertaining to activity of the set of entities, wherein each event of the plurality of events has a timestamp and includes machine data;
determining whether the search result satisfies the triggering condition;
responsive to determining that the search result satisfies the triggering condition,
determining the score for the particular entity in the set of entities based on the score contribution, the score of the particular entity being indicative of an activity of the particular entity; and causing at least one of:
- display or transmission of the score or an update to the score of the particular entity, or
- a remedial action related to the activity of the particular entity.

20. The computer system of claim 19, wherein the score of the particular entity is a risk score representing a security risk associated the particular entity.

21. The computer system of claim 19, further comprising causing display of a graphical interface (GUI) element that enables a user to select the subset of the set of entities for additional monitoring, wherein identifying the subset of the set of entities to be subjected to additional monitoring comprises receiving user inputs directed to the GUI element.

22. The computer system of claim 19, further comprising causing display of a graphical interface (GUI) element that enables a user to select and modify the subset of the set of entities for additional monitoring, wherein identifying the subset of the set of entities to be subjected to additional monitoring comprises receiving user inputs directed to the GUI element.

23. The computer system of claim 19, further comprising:
- causing display of a graphical interface (GUI) element that enables a user to specify at least a portion of the scoring rule; and
- receiving user inputs specifying at least a portion of the scoring rule, the user inputs being directed to the GUI element.

24. The computer system of claim 19, wherein the plurality of events are derived from one or more of web access logs, email logs, DNS logs or authentication logs.

25. A non-transitory computer-readable storage medium having stored therein executable instructions, execution of which by a computer system causes the computer system to perform operations comprising:
- identifying, from a set of entities to be monitored, a subset of the set of entities to be subjected to additional monitoring, based on user input received via a user interface; and
- performing the additional monitoring by:
  - accessing a scoring rule that includes a search query and a score contribution, the score contribution corresponding to a score computation to be performed, when a triggering condition is satisfied, to compute a score of a particular entity that is part of or that interacts with an information technology environment;
  - after said accessing the scoring rule, executing the search query against a plurality of events associated with activity of a set of entities that are part of or that interact with the information technology environment, wherein the search query produces a search result pertaining to activity of the set of entities, wherein each event of the plurality of events has a timestamp and includes machine data;
  - determining whether the search result satisfies the triggering condition;
  - responsive to determining that the search result satisfies the triggering condition,
  - determining the score for the particular entity in the set of entities based on the score contribution, the score of the particular entity being indicative of an activity of the particular entity; and
  - causing at least one of:
    - display or transmission of the score or an update to the score of the particular entity, or
    - a remedial action related to the activity of the particular entity.

26. The non-transitory computer-readable storage medium of claim 25, wherein the score of the particular entity is a risk score representing a security risk associated the particular entity.

27. The non-transitory computer-readable storage medium of claim 25, further comprising causing display of a graphical interface (GUI) element that enables a user to select the subset of the set of entities for additional monitoring, wherein identifying the subset of the set of entities to be subjected to additional monitoring comprises receiving user inputs directed to the GUI element.

28. The non-transitory computer-readable storage medium of claim 25, further comprising causing display of a graphical interface (GUI) element that enables a user to select and modify the subset of the set of entities for additional monitoring, wherein identifying the subset of the set of entities to be subjected to additional monitoring comprises receiving user inputs directed to the GUI element.

29. The non-transitory computer-readable storage medium of claim 25, further comprising:
- causing display of a graphical interface (GUI) element that enables a user to specify at least a portion of the scoring rule; and
- receiving user inputs specifying at least a portion of the scoring rule, the user inputs being directed to the GUI element.

30. The non-transitory computer-readable storage medium of claim 25, wherein the plurality of events are derived from one or more of web access logs, email logs, DNS logs or authentication logs.

* * * * *